US012093605B2

(12) United States Patent
Kotelly et al.

(10) Patent No.: US 12,093,605 B2
(45) Date of Patent: *Sep. 17, 2024

(54) MUSIC DISCOVERY DIAL

(71) Applicant: Sonos, Inc., Santa Barbara, CA (US)

(72) Inventors: Christopher Alexis Kotelly, Boston, MA (US); Dayn Wilberding, Portland, OR (US); Ron Kuper, Arlington, MA (US); Heather Mendonca, Brookline, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,778

(22) Filed: Sep. 26, 2023

(65) Prior Publication Data

US 2024/0103800 A1    Mar. 28, 2024

Related U.S. Application Data

(63) Continuation of application No. 18/172,115, filed on Feb. 21, 2023, now Pat. No. 11,829,682, which is a continuation of application No. 17/524,596, filed on Nov. 11, 2021, now Pat. No. 11,593,066, which is a continuation of application No. 17/135,262, filed on Dec. 28, 2020, now Pat. No. 11,175,886, which is a continuation of application No. 16/876,985, filed on May 18, 2020, now Pat. No. 10,877,726, which is a continuation of application No. 15/912,137, filed on Mar. 5, 2018, now Pat. No. 10,656,902.

(51) Int. Cl.
*G06F 3/16* (2006.01)
*G06F 3/0482* (2013.01)
*G06F 3/04883* (2022.01)
*H04R 27/00* (2006.01)

(52) U.S. Cl.
CPC ............ *G06F 3/165* (2013.01); *G06F 3/0482* (2013.01); *G06F 3/04883* (2013.01); *H04R 27/00* (2013.01); *H04R 2227/005* (2013.01)

(58) Field of Classification Search
CPC .... G06F 3/165; G06F 3/0482; G06F 3/04883; H04R 27/00; H04R 2227/005
USPC ......................................................... 715/716
See application file for complete search history.

(56) References Cited

U.S. PATENT DOCUMENTS 11,593,066 B2 * 2/2023 Kotelly .................. G06F 3/165
11,829,682 B2 * 11/2023 Kotelly ................. G06F 3/0482
(Continued)

*Primary Examiner* — William D Titcomb
(74) *Attorney, Agent, or Firm* — Fortem IP LLP

(57) ABSTRACT

Example techniques may involve tuning a music discovery dial. An implementation may include displaying, on the touch-sensitive circular graphical display, a circular graphical user interface including multiple wedge-shaped selectable regions arranged around the circumference of the circular graphical user interface, each wedge-shaped selectable region corresponding to a respective streaming audio channel. The implementation may include detecting a touch input in a circular motion to the touch-sensitive circular graphical display and causing a paired playback device to play back an audio content snippet corresponding to each selectable regions that the touch input enters. The implementation may further include switching the playback device from playing back a given pre-cached audio content snippet to playing back the full audio track from one or more servers of a streaming audio service.

20 Claims, 20 Drawing Sheets

(56) References Cited

U.S. PATENT DOCUMENTS

2015/0199122 A1* 7/2015 Garmark ............ H04M 1/72442
  715/716
2018/0115844 A1* 4/2018 Lu ............................ H04R 3/12

* cited by examiner

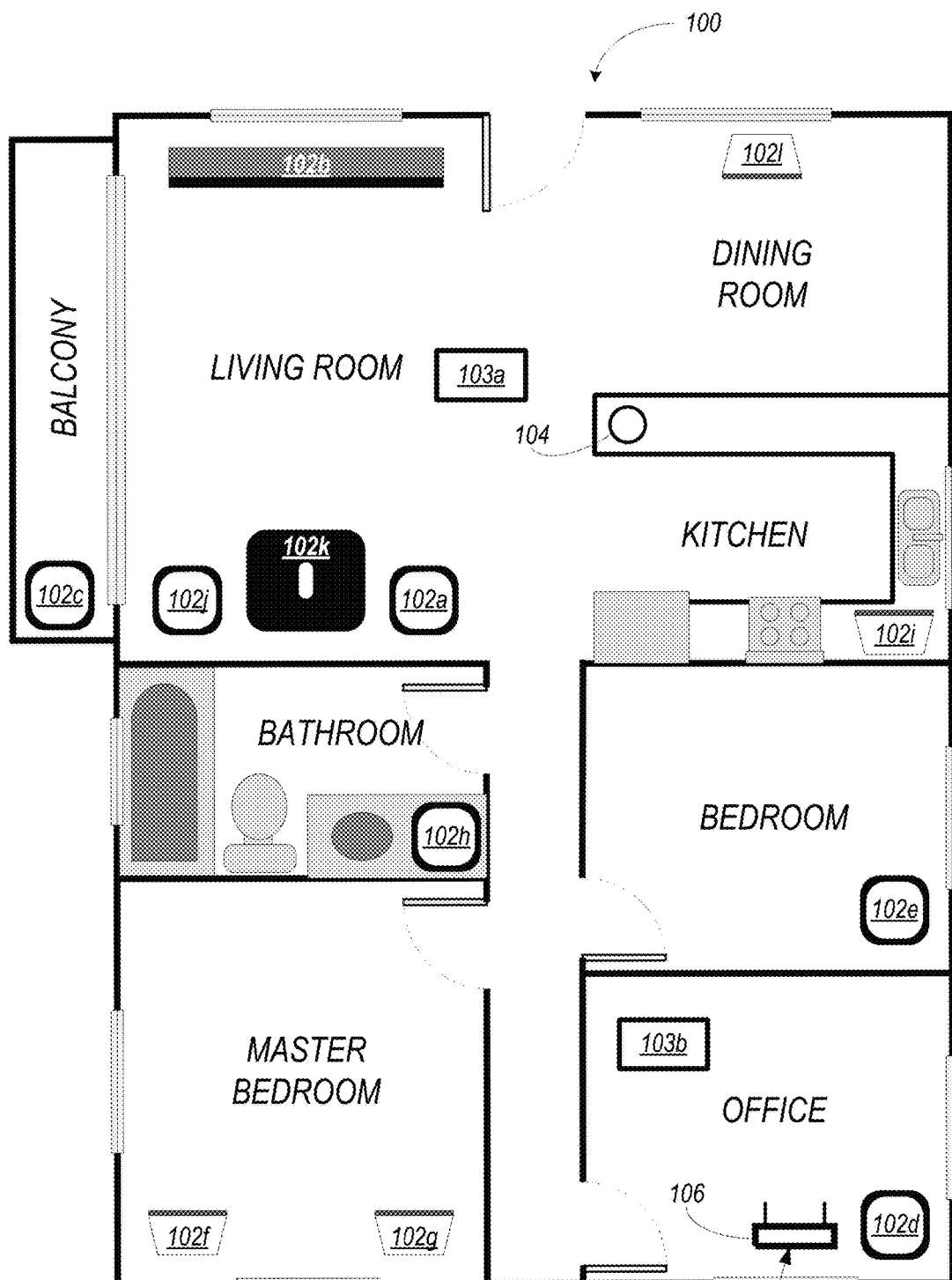
FIGURE 1
 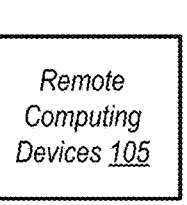

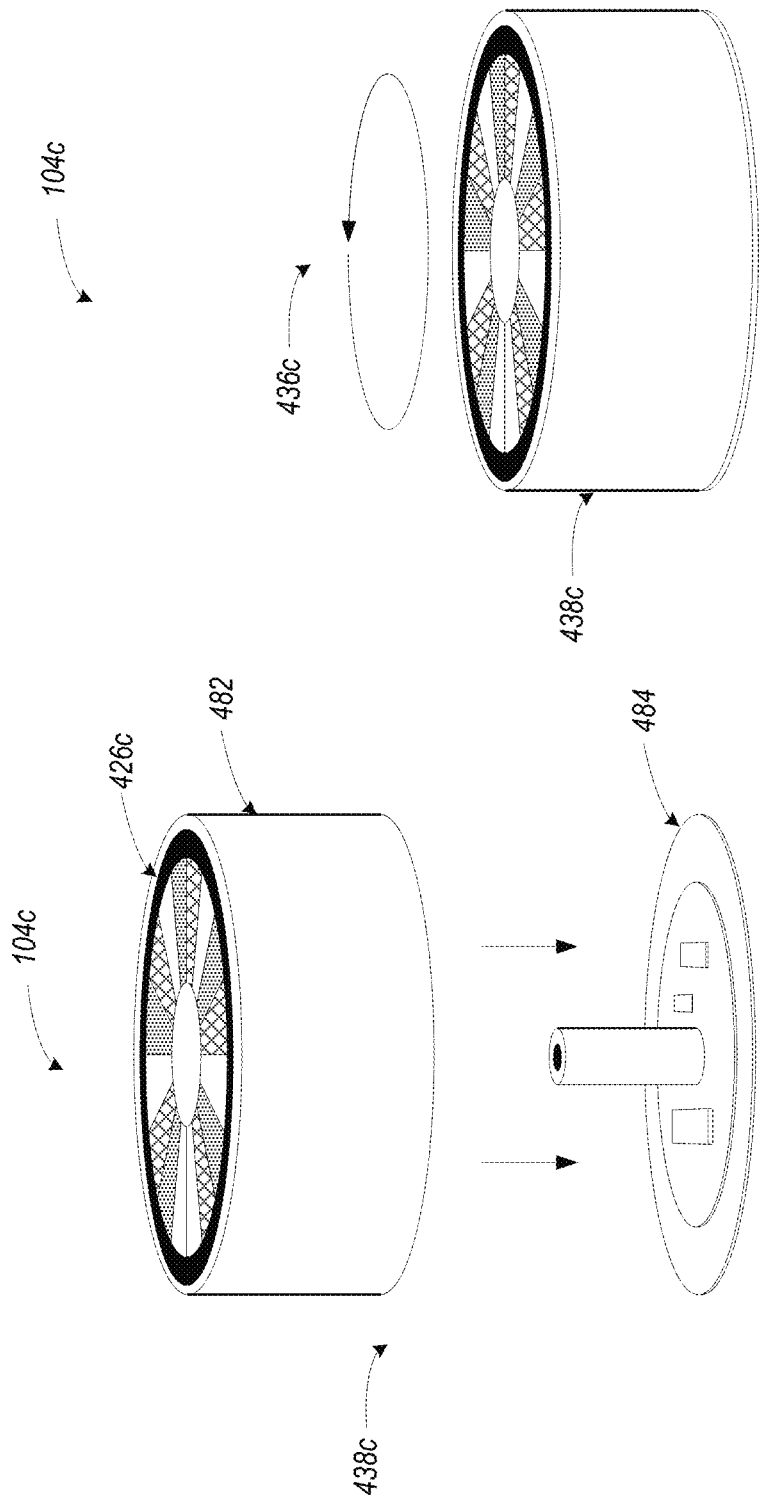

MUSIC DISCOVERY DIAL

CROSS REFERENCE TO RELATED APPLICATIONS

This application is a continuation of U.S. patent application Ser. No. 18/172,115, filed Feb. 21, 2023, now U.S. Pat. No. 11,829,682, which is a continuation of U.S. patent application Ser. No. 17/524,596, filed Nov. 11, 2021, now U.S. Pat. No. 11,593,066, which is a continuation of U.S. patent application Ser. No. 17/135,262, filed Dec. 28, 2020, now U.S. Pat. No. 11,175,886, which is a continuation of U.S. patent application Ser. No. 16/876,985, filed May 18, 2020, now U.S. Pat. No. 10,877,726; which is a continuation of U.S. patent application Ser. No. 15/912,137, filed Mar. 5, 2018, now U.S. Pat. No. 10,656,902, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 1 shows an example media playback system configuration in which certain embodiments may be practiced;

FIGS. 11A and 11B are several views of a further example command device, according to example implementations;

Figure 2:
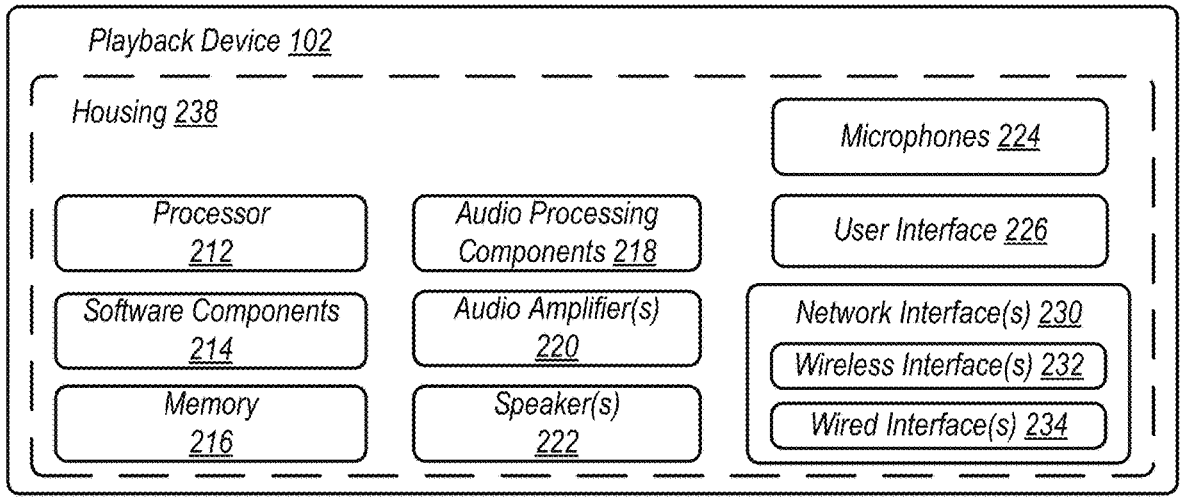
FIG. 2 shows a functional block diagram of an example playback device in accordance with aspects of the disclosure.

The drawings are for the purpose of illustrating example embodiments, but it is understood that the inventions are not limited to the arrangements and instrumentality shown in the drawings.

DETAILED DESCRIPTION

I. Overview

While streaming audio services have improved access to audio content easier by placing millions of audio tracks a click or tap away, music discovery using such services is harder than ever. For many users, instant access to millions of songs can feel like an unmanageable degree of choice. If a user knows what song they want to hear, they can play that song in a myriad of ways, such as by searching for that song, by selecting that song from a saved playlist, or by speaking a voice command to play that song, among others. However, if a user wants to stumble across something that they would not normally listen to, the graphical user interface (GUI) or voice user interface (VUI) of a streaming audio service often does not facilitate such music discovery well. Rather, such interfaces may lead a user to listen to the same music over and over, by suggesting artists and songs that are similar to what the user typically plays.

To facilitate music discovery, an example command device may include a "dial" to facilitate "tuning" to different streaming audio channels. Similar to how rotating the frequency dial of a radio tunes the radio to different stations, rotating the dial of an example command device tune the command device to different streaming audio channels. In contrast to the millions of songs available from a streaming audio service, the number of streaming audio channels of a dial can be limited to a manageable degree of choice (e.g., 30 streaming audio channels on a dial). Within examples, different streaming audio channels on the dial are linked to different types of music, allowing the user to browse by tuning the dial of the command device.

Unlike radio, a given user's command device can personalize its streaming audio channels to that user by utilizing a user's playback history. Users of streaming audio services often opt-in to collection of playback history, which enables personalization of the service for that user. Using such history, streaming audio channels can be configured to include music that is unexpected or new for a particular user, rather than just generally out-of-the-mainstream.

At the same time, users often prefer to listen to their favorite music—after all, it is their favorite for a reason. Example command devices need not relegate such music to another interface. Rather, audio channels including a user's saved artists, tracks, playlists, etc. may be interspersed around the dial. Then, by rotating the dial, a user may hear a mixture of familiar and unfamiliar music, thereby facilitating discovery of what the user wants to listen to at that moment.

To avoid delays inherent in audio streaming, samples of audio from each audio channel are pre-cached locally on the command device or on the playback device. Each "audio content snippet" may include a representative portion of an audio track from the audio channel (e.g., 5, 10, or 20 seconds of the audio track, among other examples). Since the audio content snippets are locally cached (and do not need to be streamed from a remote server of the streaming audio service), a snippet corresponding to an audio channel can begin playing immediately when the audio channel is tuned.

As noted above, each audio content snippet is a representative portion of an audio track from the audio channel. This representative portion is not necessarily the beginning of the audio track, but rather a specific portion of the audio track pre-determined to provide the user with a "sense" of the song, which may facilitate the user determining whether they want like to listen to that audio channel. Depending on the nature of the audio track, the audio content snippet for that track may be a portion of the audio track that includes a chorus, a hook, a melody, or a given chord sequence, among other examples.

Within examples, the audio channels are not played on the command device itself, but on one or more playback devices that are paired with the command device. For instance, in a zone-based media playback system, such as media playback system 100 shown in FIG. 1, a given command device may be paired with a zone (e.g., a single device or a bonded zone, such as a stereo pair) or a zone group. The command device and the one or more playback devices are communicatively coupled via a network, such as a local area network.

If an audio channel remains tuned for a period of time (e.g., until the snippet is finished playing), the command device switches the one or more one or more playback devices from playing back the pre-cached audio content snippet to playing back the second audio track from the streaming audio service. In effect, the audio content snippet and the audio track represented by that snippet are stitched together such that playback transitions seamlessly from the pre-cached audio content snippet to the audio track itself. This allows the user to continue playing the audio track beyond the portion of the audio track represented by the snippet. After the audio track finishes playing, playback proceeds to subsequent audio tracks of the tuned audio channel. Subsequent audio tracks of the channel are streamed to the one or more playback devices from one or more servers of the streaming audio service.

Within examples, the dial may be implemented as a virtual or physical dial. For instance, an example command device may include a touch-sensitive circular graphical display with the dial implemented as multiple wedge-shaped selectable regions arranged around the circumference of the circular graphical user interface. Under such an implementation, each wedge-shaped selectable region may correspond to a respective streaming audio channel and a user may tune the dial by providing a touch input to the touch-sensitive circular graphical display in a circular motion. In another example, an example command device may include a physical notched dial with each notch on the dial corresponding to a respective streaming audio channel. Under this implementation, the user may tune to a particular audio channel by rotating the dial to the notch corresponding to that channel. Implementations that use a physical dial may also include a graphical display to provide feedback on the tuned audio channel, as well as other information about the media playback system, such as an identification of the playback devices that the command device is paired with.

Other types of dials are possible as well. For instance, a "puck" command device may include a housing comprising a cylindrical portion rotatably mounted to a base. Under this implementation, the housing itself forms a dial. Components of the command device (e.g., network interface, processor(s), data storage, battery etc.) may be carried between the base and the housing such that the command device as a whole is "puck" shaped. The top surface of the "puck" shaped device may include a graphical display to provide feedback on the audio channel selected.

As noted above, example techniques may involve a music discovery dial. Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

A first implementation may include displaying, on a touch-sensitive circular graphical display, a circular graphical user interface comprising multiple wedge-shaped selectable regions arranged around the circumference of the circular graphical user interface, each wedge-shaped selectable region corresponding to a respective streaming audio channel; detecting a touch input in a circular motion to the touch-sensitive circular graphical display; when the touch input enters a first wedge-shaped selectable region, causing, via a network interface, one or more playback devices that are paired with the command device to play back a first pre-cached audio content snippet corresponding to the first wedge-shaped selectable region, the first pre-cached audio content snippet consisting of a portion of a first audio track that is representative of a first streaming audio channel corresponding to the first wedge-shaped selectable region; when the touch input enters a second wedge-shaped selectable region, causing, via the network interface, the one or more playback devices that are paired with the command device to play back a second pre-cached audio content snippet corresponding to the second wedge-shaped selectable region, the second pre-cached audio content snippet consisting of a portion of a second audio track that is representative of a second streaming audio channel corresponding to the second wedge-shaped selectable region; and as the second pre-cached audio content snippet plays back on the one or more playback devices, switching the one or more playback devices from playing back the second pre-cached audio content snippet to playing back the second audio track from one or more servers of a streaming audio service by stitching together the second audio content snippet and the second audio track such that playback transitions seamlessly from the pre-cached second audio content snippet to the second audio track.

A second implementation may include displaying, on a touch-sensitive rectangular graphical display, a rectangular graphical user interface comprising multiple selectable regions that divide the rectangular graphical user interface, each selectable region corresponding to a respective streaming audio channel; detecting a touch input in a horizontal motion to the touch-sensitive circular graphical display; when the touch input enters a first selectable region, causing, via a network interface, one or more playback devices that are paired with the command device to play back a first pre-cached audio content snippet corresponding to the first selectable region, wherein the first pre-cached audio content snippet consists of a portion of a first audio track that is representative of a first streaming audio channel corresponding to the first wedge-shaped selectable region; when the touch input enters a second wedge-shaped selectable region, causing, via the network interface, the one or more playback devices that are paired with the command device to play back a second pre-cached audio content snippet corresponding to the second wedge-shaped selectable region, wherein the second pre-cached audio content snippet consists of a portion of a second audio track that is representative of a second streaming audio channel corresponding to the second wedge-shaped selectable region; and as the second pre-cached audio content snippet plays back on the one or more playback devices, switching the one or more playback devices from playing back the second pre-cached audio content snippet to playing back the second audio track from one or more servers of a streaming audio service by stitching together the second audio content snippet and the second audio track such that playback transitions seamlessly from the pre-cached second audio content snippet to the second audio track.

A third implementation may include displaying, on a circular graphical display, a circular graphical user interface comprising multiple wedge-shaped selectable regions arranged around the circumference of the circular graphical user interface, each wedge-shaped selectable region corresponding to a respective streaming audio channel; detecting rotation of a cylindrical portion of a housing about a base, the cylindrical portion of the housing and the base forming a notched dial in which each notch on the dial corresponds to a respective wedge-shaped selectable region; as the rotation of the cylindrical portion continues about the base, scrolling the circular graphical user interface through the multiple wedge-shaped selectable regions in the direction of the rotation, the circular graphical user interface scrolling through a wedge-shaped selectable region for each notch on the dial; when the dial selects a second first wedge-shaped selectable region, causing, via a network interface, one or more playback devices that are paired with the command device to play back a first pre-cached audio content snippet corresponding to the first wedge-shaped selectable region, wherein the first pre-cached audio content snippet consists of a portion of a first audio track that is representative of a first audio channel corresponding to the first wedge-shaped selectable region; when the dial selects a second wedge-shaped selectable region, causing, via the network interface, the one or more playback devices that are paired with the command device to play back a second pre-cached audio content snippet corresponding to the second wedge-shaped selectable region, wherein the second pre-cached audio content snippet consists of a portion of a second audio track that is representative of a second audio channel corresponding to the second wedge-shaped selectable region; and as the second pre-cached audio content snippet plays back on the one or more playback devices, switching the one or more playback devices from playing back the second pre-cached audio content snippet to playing back the second audio track from one or more servers of a streaming audio service by stitching together the second audio content snippet and the second audio track such that playback transitions seamlessly from the pre-cached second audio content snippet to the second audio track.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), controller devices 103a and 103b (collectively "controller devices 104"), and command device 104.

The various playback, controller devices, and command 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) 105 may be cloud servers. The remote computing device(s) 105 may be configured to interact with the media playback system 100 in various ways. For example, the remote computing device(s) may be configured to facilitate streaming and controlling playback of media content, such as audio, in the home environment, perhaps as part of providing a streaming audio service via WAN 107. In some examples, the remote computing device(s) 105 may be representative of cloud servers from multiple services, perhaps operated by different entities.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, command, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

FIG. 2 is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, microphone(s) 224, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device may include neither the speaker(s) 222 nor the audio amplifier(s) 222, but rather an line-out interface for connecting a playback device to an external audio amplifier or audio-visual receiver. The playback device includes a housing 238 carrying its constituent components.

A playback device may further include a user interface 226. The user interface 226 may facilitate user interactions independent of or in conjunction with one or more of the controller devices 104. In various embodiments, the user interface 226 includes one or more of physical buttons and/or graphical user interfaces provided on touch sensitive screen(s) and/or surface(s), among other possibilities, for a user to directly provide input. The user interface 226 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 might include only wireless interface(s) or only wired interface(s) in various examples.

By way of illustration, SONOS, Inc. presently offers (or has offered) for sale certain playback devices including a "PLAY:1," "PLAY:3," "PLAY:5," "PLAYBAR," "CON- NECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 102a, 102b, 102j, and 102k may be configured to play audio content in synchrony as individual playback devices, as one or more bonded playback devices, as one or more consolidated playback devices, or any combination thereof. Similarly, in the case of the master bedroom, playback devices 102f and 102g may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102c while another user may be preparing food in the kitchen zone and listening to classical music being played by the playback device 102i. In another example, a playback zone may play the same audio content in synchrony with another playback zone. For instance, the user may be in the office zone where the playback device 102d is playing the same rock music that is being playing by playback device 102c in the balcony zone. In such a case, playback devices 102c and 102d may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102c from the balcony zone to the office zone, the office zone may now include both the playback device 102d and the playback device 102c. The playback device 102 may be paired or grouped with the office zone and/or renamed if so desired via a control device such as the control devices 103a and 103b. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 102i and 102l may render audio content in synchrony. On the other hand, the living room zone may be split into a television zone including playback device 102b, and a listening zone including playback devices 102a, 102j, and 102k, if the user wishes to listen to music in the living room space while another user wishes to watch television.

c. Example Control Devices

Figure 3:
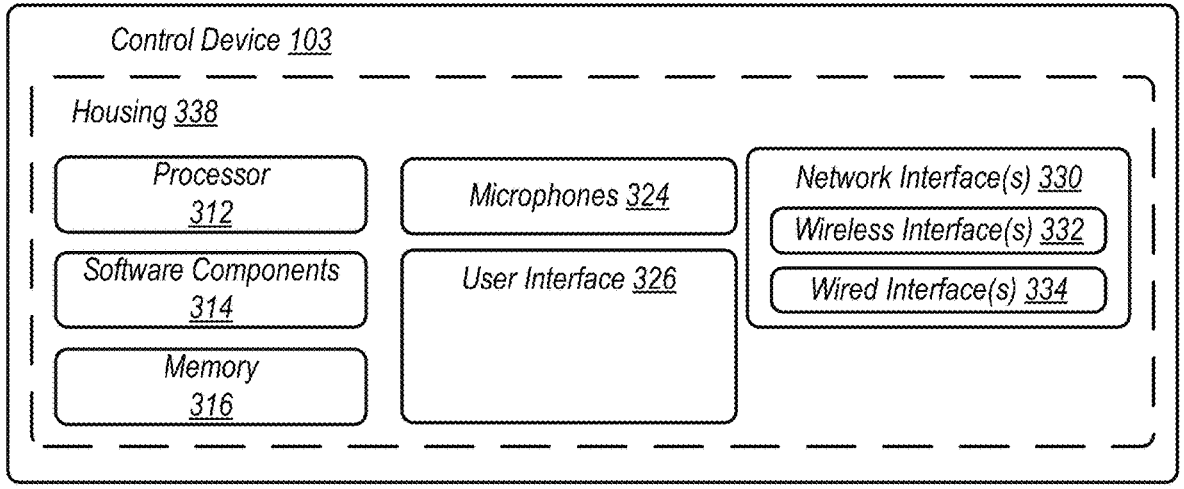
FIG. 3 shows a functional block diagram of an example control device in accordance with aspects of the disclosure.

FIG. 3 is a functional block diagram illustrating certain aspects of a selected one of the controller devices 103 of the media playback system 100 of FIG. 1. Such controller devices may also be referred to as a controller or a control device. The controller device shown in FIG. 3 may include components that are generally similar to certain components of the network devices described above, such as a processor 312, memory 316, and a network interface 330. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™) The controller device 103 includes a housing 338 carrying its constituent components.

The memory 316 of the controller device 103 may be configured to store controller application software and other data associated with the media playback system 100 and a user of the system 100. The memory 316 may be loaded with one or more software components 314 executable by the processor 312 to achieve certain functions, such as facilitating user access, control, and configuration of the media playback system 100. The controller device 103 communicates with other network devices over the network interface 330, such as a wireless interface, as described above.

The control device 103 may include a plurality of microphones arranged to detect sound in the environment of the controller device 103. The microphones may detect voice inputs to the media playback system 100, process those inputs, perhaps using one or more VASs, and carry out the commands on one or more playback devices 102.

Playback device control commands such as volume control and audio playback control may also be communicated from a controller device to a playback device via the network interface 330. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

In one example, data and information (e.g., such as a state variable) may be communicated between a controller device and other devices via the network interface 330. For instance, playback zone and zone group configurations in the media playback system 100 may be received by a controller device from a playback device, another controller device, or another network device, or transmitted by the controller device to another playback device or controller device via the network interface 330. In some cases, the other network device may be another controller device.

Figure 4:
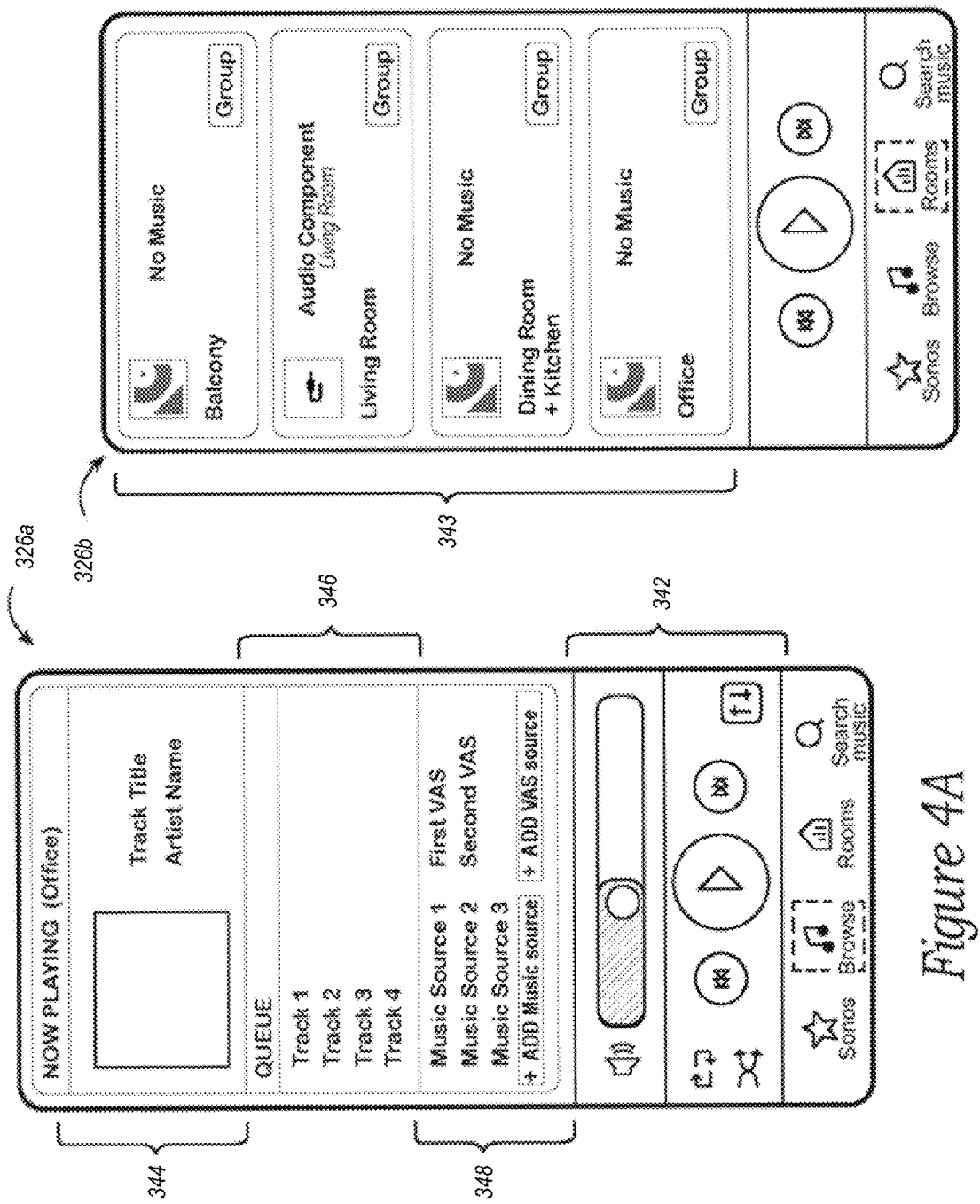
FIGS. 4A and 4B are example controller interfaces in accordance with aspects of the disclosure.

The user interface(s) 326 of a controller device may be configured to facilitate user access and control of the media playback system 100, by providing controller interface(s) such as the controller interfaces 326a and 326b shown in FIGS. 4A and 4B, respectively, which may be referred to collectively as the controller interface 326. Referring to FIGS. 4A and 4B together, the controller interface 326 includes a playback control region 342, a playback zone region 343, a playback status region 344, a playback queue region 346, and a sources region 348. The user interface 326 as shown is just one example of a user interface that may be provided on a network device such as the controller device shown in FIG. 4 and accessed by users to control a media playback system such as the media playback system 100. Other user interfaces of varying formats, styles, and interactive sequences may alternatively be implemented on one or more network devices to provide comparable control access to a media playback system.

The playback control region 342 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 342 may also include selectable icons to modify equalization settings, and playback volume, among other possibilities.

The playback zone region 343 (FIG. 4B) may include representations of playback zones within the media playback system 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 300 are also possible. The representations of playback zones in the playback zone region 343 (FIG. 4B) may be dynamically updated as playback zone or zone group configurations are modified.

The playback status region 344 (FIG. 4A) may include graphical representations of audio content that is presently being played, previously played, or scheduled to play next in the selected playback zone or zone group. The selected playback zone or zone group may be visually distinguished on the user interface, such as within the playback zone region 343 and/or the playback status region 344. The graphical representations may include track title, artist name, album name, album year, track length, and other relevant information that may be useful for the user to know when controlling the media playback system via the user interface 326.

The playback queue region 346 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 346 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

d. Example Audio Content Sources

The sources region 348 (FIG. 4A) may include graphical representations of selectable audio content sources and voice assistant services (VAS). The audio sources in the sources region 348 may be audio content sources from which audio content may be retrieved and played by the selected playback zone or zone group. One or more playback devices in a zone or zone group may be configured to retrieve for playback audio content (e.g., according to a corresponding uniform resource identifier (URI) or uniform resource locator (URL) for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

III. Example Command Device Implementations

Figure 5:
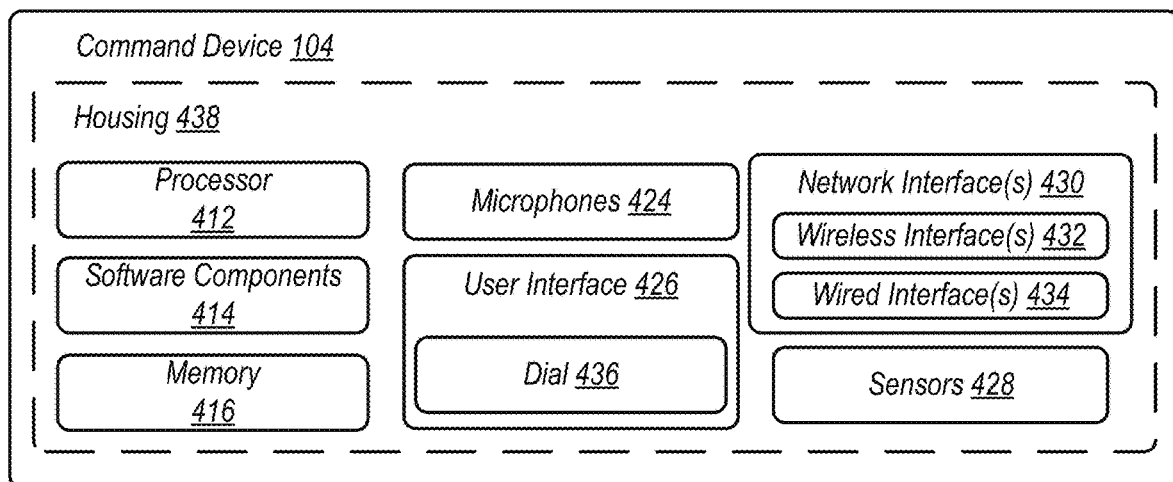
FIG. 5 shows a functional block diagram of an example command device in accordance with aspects of the disclosure.

FIG. 5 is a functional block diagram illustrating certain aspects of the command device 104 of the media playback system 100 of FIG. 1. The command device shown in FIG. 5 may include components that are generally similar to certain components of the playback devices and control devices described above, such as a processor 412, memory 416, microphones 424, and a network interface 430. The command device includes a housing 438 carrying its constituent components.

The memory 416 of a command device 104 may be configured to store command application software and other data associated with the media playback system 100 and a user of the system 100. The memory 416 may be loaded with one or more software components 414 executable by the processor 412 to achieve certain functions, such as facilitating user access, control, and configuration of one or more particular playback device(s) 102 of the media playback system 100 that the command device is paired with. A command device communicates with other network devices over the network interface 430, such as a wireless interface, as described above.

A command device may further include a user interface 426. The user interface 426 may facilitate user interactions independent of or in conjunction with one or more of the playback devices 102 and controller devices 103. In various embodiments, the user interface 426 includes one or more of physical buttons and/or graphical user interfaces provided on touch sensitive screen(s) and/or surface(s), among other possibilities, for a user to directly provide input. The user interface 426 may further include one or more of lights and a vibration motor to provide visual or haptic feedback to a user.

The user interface 426 may facilitate establishment of a pairing relationship between a command device 104 and one or more particular playback devices (e.g., a zone, zone group, or other arrangement, such as a Room or Area). Establishment of a pairing relationship causes commands issued on the command device 104 to be carried out on the paired playback device 102. While paired, the command device is dedicated to controlling the paired playback device 102, thereby obviating the need for selecting or otherwise designating the playback device 102 that is to be controlled via commands on the command device 104.

A command device 104 can be considered a controller device for a paired playback device 102 while a controller device 103 is a controller device for all playback devices 102 in media playback system 100. In contrast to a command device 104, a command device 103 is not paired to a specific playback device 102, but instead provides user interfaces(s) 326 that facilitates control of multiple playback devices 102 of the media playback system 100, either individually or concurrently. As such, while a command device 104 can be expected to control its paired playback device 102 (at least until paired with a different playback device 102), a user using controller device 103 for control in a multiple playback device media playback system (e.g., media playback system 100) may, in some cases, verify which playback device 102 (or associated zone or zone group) is currently being controlled with command device 103. If control of a different playback device 102 is desired, the user may utilize user interfaces 440 of the controller device to select a different playback device 102 for control.

The microphones 424 may facilitate pairing between the command device 104 and one or more nearby playback devices 102. The playback devices 102 may emit sounds (e.g., ultrasonic tones) identifying themselves. The command device 104 may detect these sounds via the microphones 424 to determine the nearest playback device 102 (which may be part of a zone, group, or area), The command device 104 may then initiate pairing with that playback device 102, as well as other speakers in the zone, group, or area.

For instance, in one example, the gain levels of the sounds emitted by each playback device 102 may be used as a proxy for distance. The detected gain level of the sound emitted by each playback device 102 may be entered into a table (perhaps that is distributed among devices of the media playback system 100, e.g., if multiple playback devices 102 and/or command devices 104 are present in the system) and compared to determine the playback device 102 with the highest gain as detected by a particular command device 104. The particular command device 104 may pair with this playback device 102. For instance, referring back to FIG. 1, playback device 102i may pair with command device 104, based on proximity of the two devices.

The sensors 428 may include sensors configured to detect proximity of a user to the command device, such as proximity sensor(s) motion sensor(s), or light sensor(s). In some cases, the sensors may detect a user via a device carried by a user, such a smartphone (which may implement a command device 103). Such detection may involve BLUETOOTH® beacons, radio frequency proximity detection, or microphone detection (of sound emitted by the command device or the device carried via the user).

The user interface 426 provides a dial 436. The dial 436 facilitates "tuning" to different streaming audio channels. Similar to how rotating the frequency dial of a radio tunes the radio to different stations, rotating the dial 436 tunes the command device to different streaming audio channels, which are then played on the paired playback device(s) 102. The command device 104 may include a virtual dial on a graphical display or a physical dial, or both.

Figure 6A:
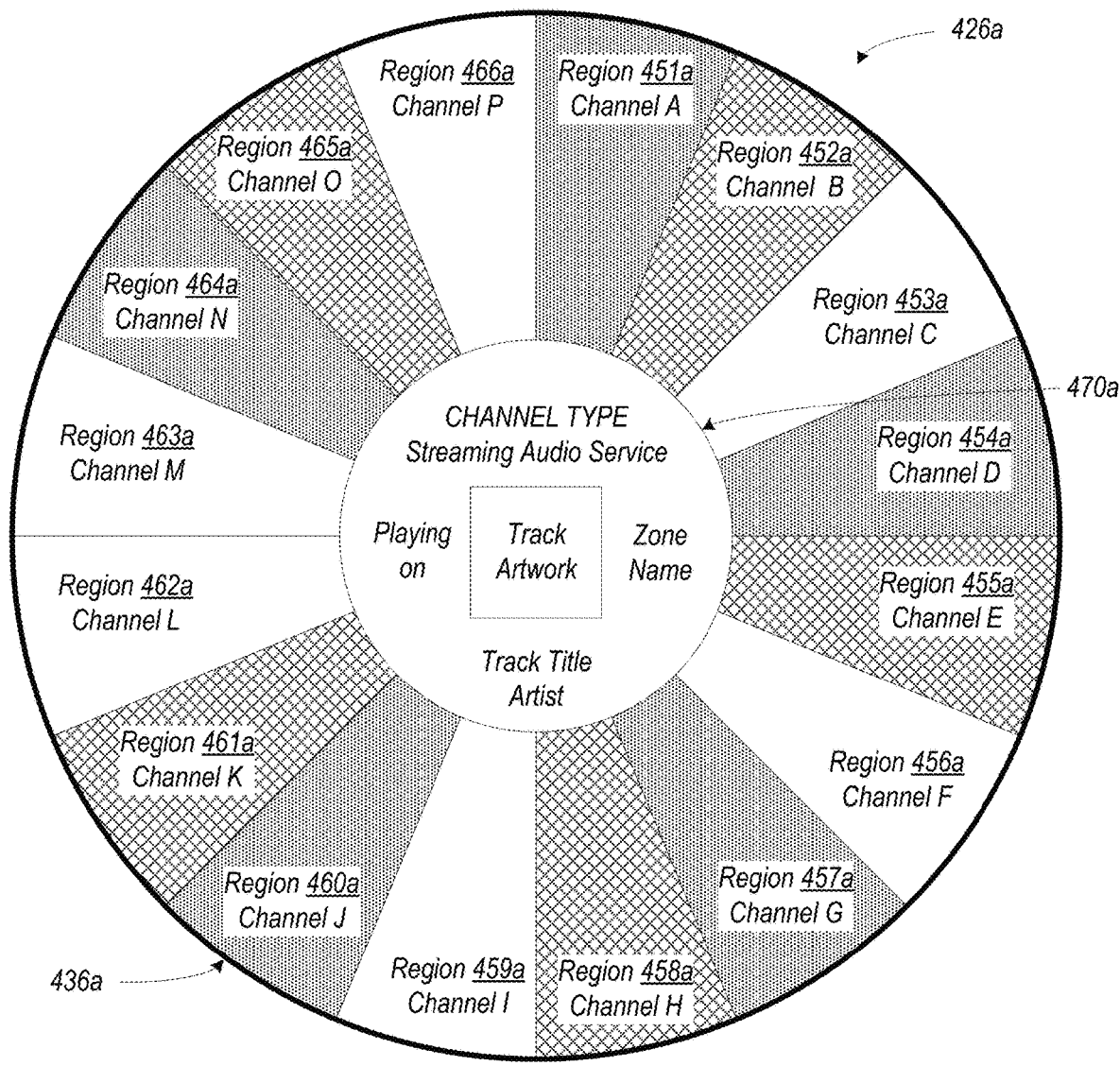
FIGS. 6A, 6B, and 6C are example dial interfaces in accordance with aspects of the disclosure.

FIG. 6A shows an example user interface 426a that includes a dial 436a, which the command device 104 displays on a touch-sensitive graphical display. Dial 436a includes multiple wedge-shaped selectable regions 451a-466a arranged around the circumference of the user interface 426a. Each selectable region 451a-466a corresponds to a respective streaming audio channel (designated channels A-P). Selection of a particular selectable region (e.g., via touch input to the region) causes the channel to begin playing on the playback device(s) 102 that are paired with the command device 104.

A streaming audio channel provides a series of streaming audio tracks. By selecting a given selectable regions v, a user can select a channel, but the individual audio tracks within the channel are not individually selectable, similar to a radio station. Some channels may be Internet radio stations (e.g., PANDORA® internet radio stations). Other channels may include playlists (either curated by a streaming media service or playlists that the user has created, perhaps via a graphical user interface of a streaming media service). A curator may curate or otherwise create playlists to correspond to certain artists (e.g., a Duran Duran channel including songs by Duran Duran and similar artists), albums (e.g., a "OK Computer" album including songs on Radiohead's "OK Computer" album and similar songs), genres (e.g., rock, rap, folk, classical, jazz, etc.), song (e.g., songs similar to a particular audio track), among others. Other channels may include streaming books, podcasts, as well as other types of streaming audio.

In some examples, the particular audio channels shown on the dial (referred to collectively as a "content list") are customized to a particular user account that is currently active (e.g., logged on) to the command device or to the media playback system 100 generally. A user of media playback system 100 may have an associated user account of the media playback system 100. Given user opt-in, the media playback system 100 may track a playback history of the user account across multiple streaming audio services, which the media playback system 100 may use to generate customized audio channels.

In addition, user accounts from one or more streaming audio services media playback system 100 are registered with the media playback system 100 (e.g., by providing a username and password, thereby enabling the media playback system 100 to access streaming audio content from servers of the streaming audio service). Given user opt-in, a given service may track playback history of the user account and generate customized playlists and other audio content containers that are available to the media playback system 100 via a URI or URL and populated as an audio channel.

The content list may be maintained on the command device 104, on the paired playback device(s) 102, or retrieved via the LAN provided by router 106 or the WAN 107 from another network device. The command device 104 may refresh the content list periodically (e.g., daily or weekly) or based on a trigger, such as the presence of a user in proximity to the command device 104.

The audio channels may include content from different audio content sources, such as different streaming audio services. As noted above, users of the media playback system 100 may register multiple audio content sources with the media playback system 100, including multiple streaming audio sources. As such, different channels may be associated with different streaming audio services. For instance, channels A, D, and G may be a radio station of a first streaming audio service (e.g., a TuneIn® radio station), an internet radio station of a second streaming audio service (e.g., a Pandora® internet radio station) and a curated discovery playlist that includes audio tracks suggested by the streaming audio service for a particular user account (e.g., a SPOTIFY® "Discovery" playlist), respectively. Moreover, the channels displayed for a particular user may include multiple channels of the same type from the same streaming audio service (albeit with different audio content) or different streaming audio services. Other examples are possible as well.

As shown in FIG. 6A example, respective subsets of the audio channels A-P are categorized into three different types of audio content: user's music, discovery, and sponsored content. In some examples, selectable regions of different subsets on the user interface 426 are differentiated using a different color or texture to provide a visual indication of the type of audio content in each channel. Alternatively, the selectable regions of different subsets might not be differentiated to avoid the user gravitating towards a particular one of the subsets. Various examples may include any combination of these different types of audio content.

User's music channels include content that the particular user account active on the command device 104 (or the media playback system 100 generally) has saved within the media playback system 100 or within one or more streaming audio services. For instance, channel C may include a playlist saved by the user account of the media playback system 100, which may include audio tracks from multiple streaming audio services. As another example, channels F and I may include a saved album and a saved playlist associated with the user account(s) of one or more streaming audio services.

Discovery music channels include content that is unexpected for the user. For instance, using the playback history of the user account(s), audio channels may be generated with artists, albums, genres that the user has not played back, or does not typically play back. Other discovery audio channels may include new release audio tracks. For instance, one channel may include new release audio tracks from artists that the user account typically listens to, while another channel may include new release audio tracks from artists that the user account does not typically listen to. Streaming audio services, such as SPOTIFY®, may generate their own "Discovery" playlists, which the command device 104 may provide as audio channels. Yet further, a streaming audio service may provide dedicated audio channels that are available only through the command device. Other examples consistent with music discovery are possible as well.

Sponsored audio channels may include audio content that is provided as paid placement or ad-supported radio content, among other examples. For instance, sponsored audio channels may include audio content from a particular record label, band, artist, podcast, playlist, or streaming audio service that the respective party would like to promote. As another example, sponsored audio channels may be an ad-supported internet radio stations. Other examples are possible as well.

As further shown in FIG. 6A example, respective subsets of the audio channels A-P from three different types of audio content are interspersed around the dial 436a. Such placement of the audio channels causes the listener to hear a mixture of different types of audio content when tuning the dial 436a, which may facilitate the listener finding the audio content that they want to listen to. Such placement is similar to how the FM and AM radio bands of a given geographical area will include a mixture of radio stations providing audio content of different types at different frequencies interspersed across the radio bands. However, unlike radio, the audio channels of the command device 104 are customized to the user.

Selectable regions 451a-466a are wedge-shaped to facilitate arrangement around the circumference of the user interface 426a. While wedge-shaped selectable regions are shown by way of example, other implementations may utilize selectable regions of different shapes, such as rectangles, hexagons or octagons, among other examples. For instance, hexagonal selectable regions may be tessellated over a user interface.

Figure 6B:
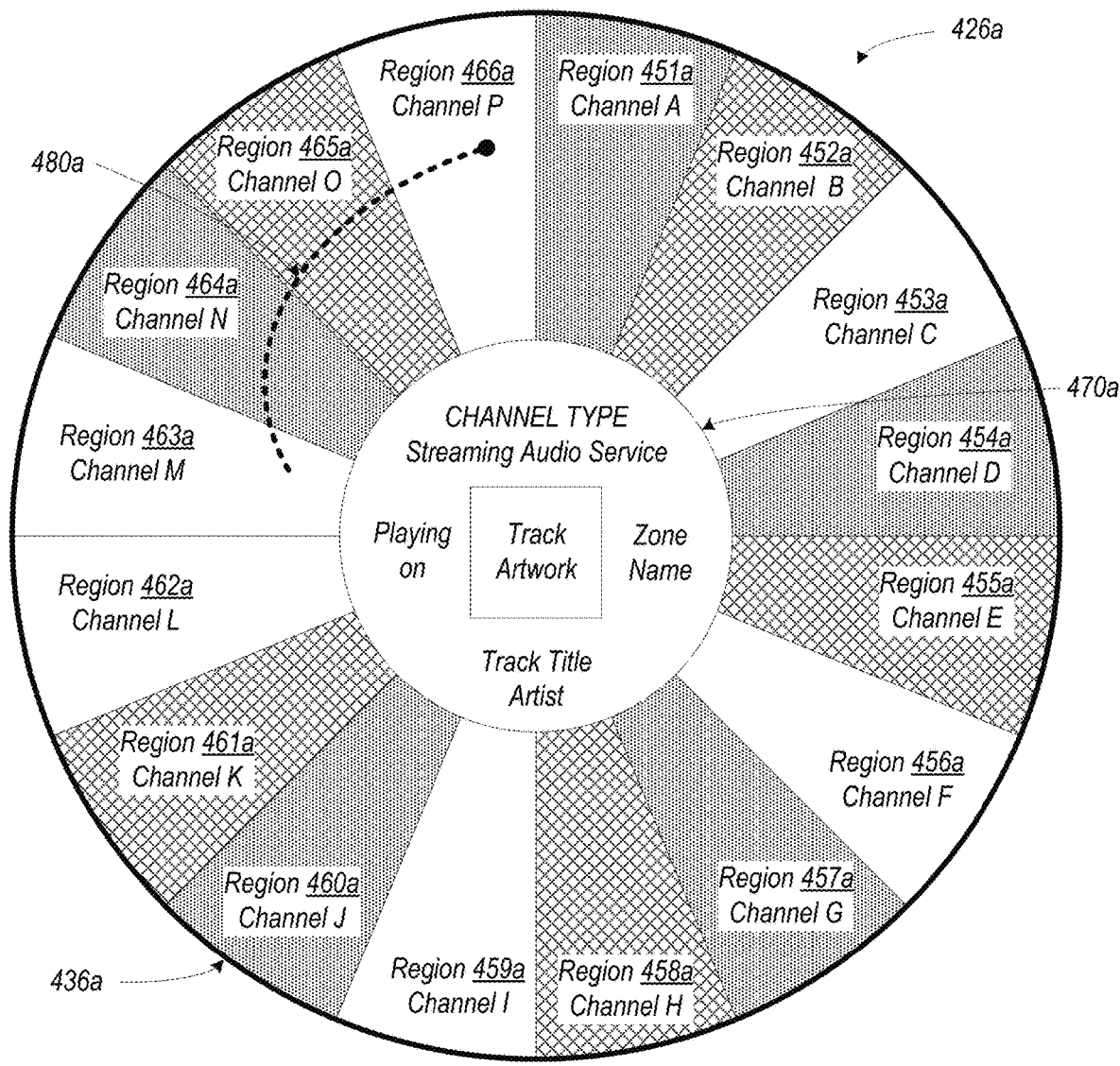

Tuning the dial 436a involves a touch input in a circular motion. To illustrate, FIG. 6B shows an example touch input 480a to example user interface 426a. As shown, touch input 480a begins on selectable region 463a and continues through regions 464a and region 465a and stops on region 466a, where the touch input is lifted. As the touch input touches or enters each selectable region, content from that audio channel starts playing on the paired playback device(s) 102.

User interface 426a also includes a central region 470a that includes information about the currently playing audio channel. In particular, the central region 470a includes an indication of the channel type, the streaming audio service providing the audio channel, the audio track title and the artist, as well as artwork for the currently playing audio track of the channel (e.g., album artwork, a book cover, or a podcast logo, among other examples). The central region 470a also includes an indication of the paired playback devices 102. In this example, the indication is by reference to the name of a zone or zone group of media playback system 100 (i.e., "Playing on <zone name>"). This example is merely illustrative, and the command device 104 may present such information concurrently with the dial 436 in a variety of ways.

User may interact with the dial using other types of touch inputs. For instance, a user may tune a particular audio channel by directly selecting the corresponding selectable region (e.g., via a tap touch-input to a given selectable region 451a-466a). As further examples, various inputs to the dial 436a may operate as transport controls. For instance, a tap to the central region 470a may cause the paired playback device(s) 102 to play or pause, depending on the state of the paired playback device 102. As further examples, right or left swipe touch inputs may cause the command device 104 to skip backward or forward through the audio channels. Yet further, a press and hold input may cause the command device 104 to seek through the audio channels.

Figure 6C:
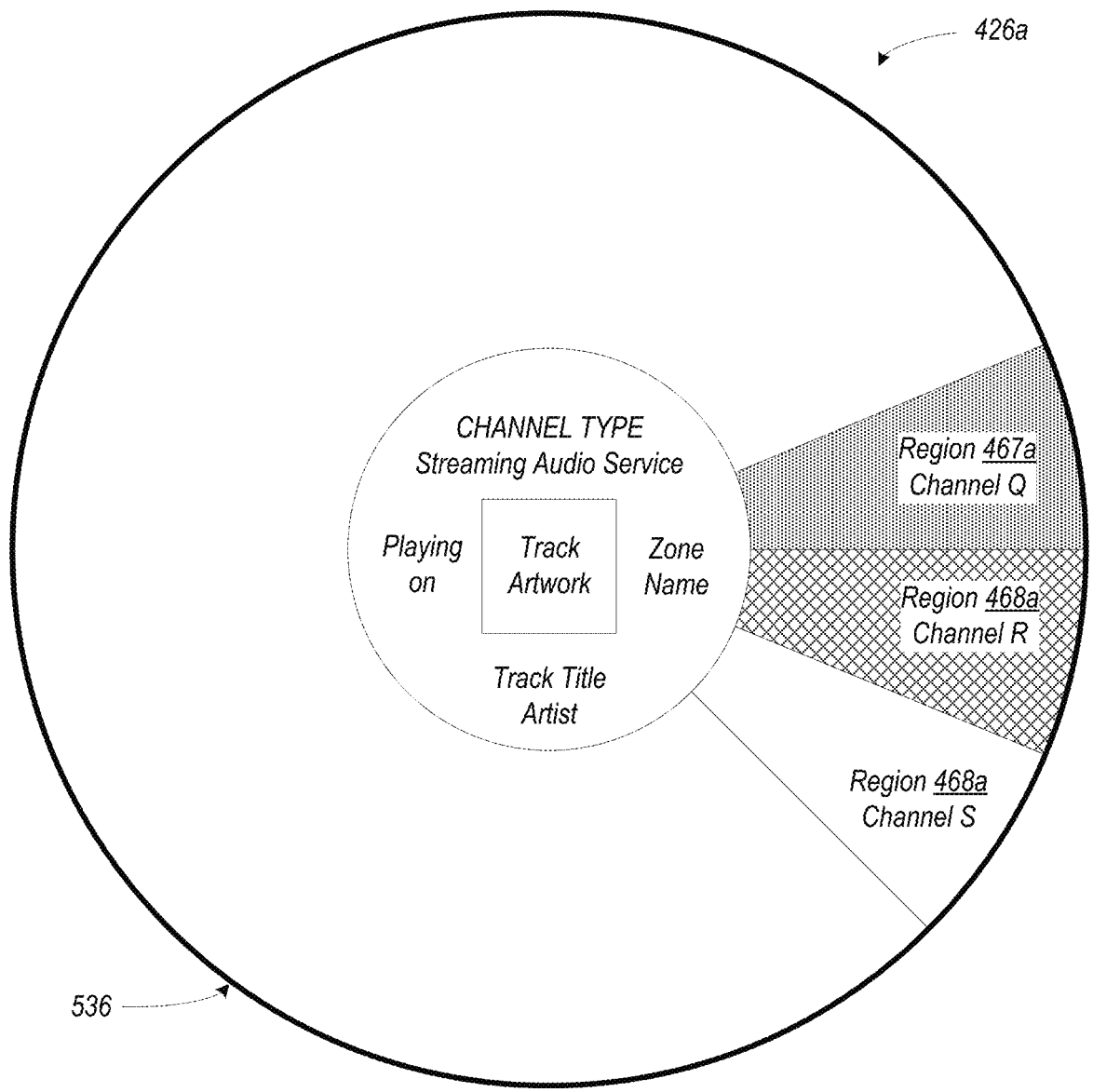

In some examples, a touch input to a particular selectable region (e.g., a long press) may cause the user interface 426 to display a second dial with additional selectable regions corresponding to audio channels. To illustrate, FIG. 6C shows dial 536 with additional selectable regions 467a, 468a, and 469a, which the command device 104 displays after region 455a is selected. Dial 536 allows fine-tuning of the dial 436 to refine or explore audio channels similar to the Channel E corresponding to the region 455a. For instance, if Channel E corresponds to a given genre, Channels Q, R, and S may correspond to sub-genres of the given genre. As another example, if Channel E corresponds to a given artist, Channels Q, R, and S may correspond to other channels associated that that artists, such as channels based on a given album of the artist, or a given Internet radio station based on the artist, among other examples.

In some examples, each audio channel is associated with a respective content link (e.g., a URI or URL) from which the respective audio channel is streamable to the paired playback device(s) 102. However, streaming content directly from the servers of the respective streaming audio services providing each channel might not lead to a good user experience when tuning the dial 436. Since some delay is inherent in streaming audio, streaming audio content directly from the URI may cause a delay between tuning to an audio channel and that audio channel beginning to play back on the paired playback device(s) 102.

To avoid such delays inherent in audio streaming, the command device 104 (or another device of the media playback system 100), such as the paired playback device(s) 102 may pre-cache "snippets" of audio content from each audio channel locally within the LAN provided by network router 106. Each "audio content snippet" may include a representative portion of an audio track from the audio channel (e.g., 5, 10, or 20 seconds of the audio track, among other examples). Since the audio content snippets are locally cached (and do not need to be streamed from a remote server of the streaming audio service), a snippet corresponding to an audio channel can begin playing immediately when the audio channel is tuned.

As noted above, each audio content snippet is a representative portion of an audio track from the audio channel. This representative portion is not necessarily the beginning of the audio track since this portion of the audio track might have a slow or quiet intro or otherwise be uncharacteristic of the audio track as a whole. Instead, each audio content snippet is a specific portion of the audio track pre-determined to provide the user with a "true sense" of the audio track, which may facilitate the user determining whether they want like to listen to that audio channel. Depending on the nature of the audio track, the audio content snippet for that track may be a portion of the audio track that includes a chorus, a hook, a melody, or a given chord sequence, among other examples.

To cache such audio content snippets, the command device 104 (or another caching network device connected to the LAN provided by network router 106) may pre-stream the representative portion of the audio track from the audio channel and store that portion in data storage (e.g., in memory 416) as an audio content snippet. The representative portion of the audio track is identified, for example, by metadata in the audio track indicating an offset from the beginning of the audio track where the representative portion begins. Alternatively, the representative portions of the audio tracks are identified in a look-up table storing offsets for various audio tracks, which may be maintained locally or on a remote server.

Designation of the offsets identifying the representative portions of each audio track may be human-performed or algorithmic. Within examples, artist or producer designates the offsets for each audio track (to be stored in metadata or the look-up table). Alternatively, the offsets for each audio track are determined algorithmically (e.g., by an artificial intelligence algorithm that determines the most-played portions of each audio track from playback history data of a user account or multiple user accounts in aggregate, perhaps across multiple streaming audio services).

Referring back to FIG. 6B, in implementations that use audio content snippets as described above, as the touch input 480a touches or enters each selectable region, audio content snippets from the respective audio channel starts playing on the paired playback device(s) 102. In particular, the command device 104 may cause the paired playback device(s) 102 to play back the audio content snippet for a given audio channel by streaming that audio content snippet to the paired playback device(s) 102. For instance, the command device 104 may establish an audio pipeline between the command device 104 and the paired playback device(s) 102 via the LAN provided by network router 106. An example audio pipeline is a persistently hosted at a given content link at the command device 104.

Given an established audio pipeline, the command device 104 feeds the audio content snippet for the given audio channel into the audio pipeline for playback by the paired playback device(s) 102. As different audio channels are tuned on the dial 436a (e.g., as the touch input 480a moves from region 463a to region 464a to region 465a), the audio content snippet for each audio channel (e.g., channels M, N, and O) are fed into the established audio pipeline. This arrangement may facilitate tuning between audio channels without significant delay.

If the dial 436 remains tuned to a particular audio channel (e.g., audio channel P when the touch input 480a ends on region 466a), the command device 104 switches the paired playback device(s) 102 from playing back the pre-cached audio content snippet to playing back the full audio track from its content link. Such switching allows the audio track to continue playing on the paired playback device(s) 102 after the paired playback device(s) 102 play back the representative portion of the audio track (i.e., the pre-cached audio snippet). After the first audio track of the audio channel finishes playing, playback of the audio channel on the paired playback device(s) 102 continues with subsequent audio tracks of the audio channel.

Figure 7:
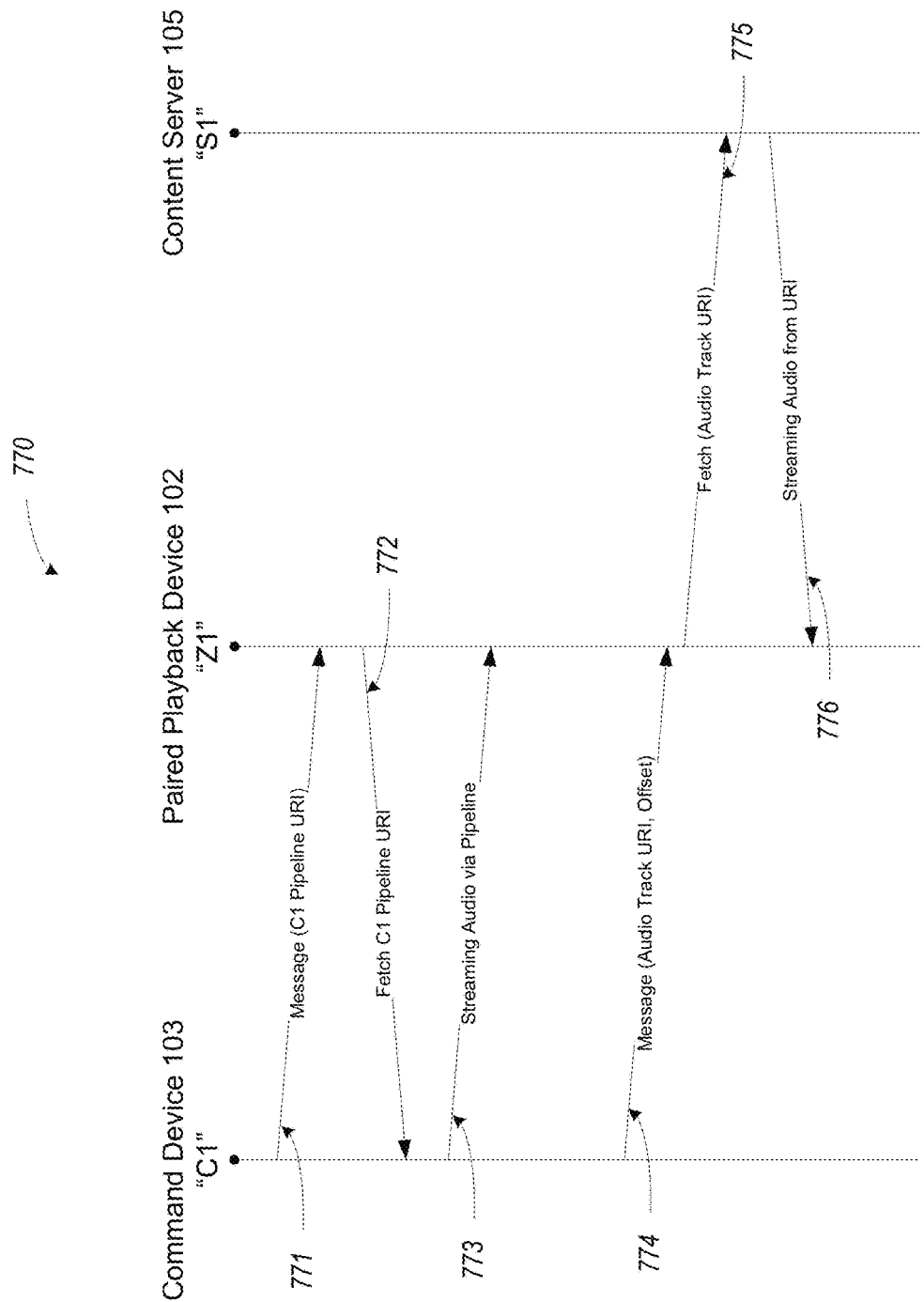
FIG. 7 is an example message flow diagram in accordance with aspects of the disclosure.

To switch the paired playback device(s) 102 from playing back the pre-cached audio content snippet to playing back the audio track, the command device effectively stitches together the audio content snippet and the audio track such that playback by the paired playback device(s) 102 transitions seamlessly from the pre-cached audio content snippet to the audio track. To illustrate, FIG. 7 is a message flow diagram showing instructions exchanged between the command device 104, the paired playback devices 102, and the remote computing devices 105 (i.e., content servers of one or more streaming audio services). Such messages are representative and may include additional or fewer messages.

At 771, the command device 104 sends a message to the paired playback device 102 that includes the URI for an audio pipeline established by the command device 104. The message may include an address of the paired playback device 102 and a command to play back the audio at the URI of the audio pipeline. As noted above, the command device 104 feeds respective audio snippets into the audio pipeline as each audio channel is tuned via the dial 436. Based on receiving this message, at 772, the paired playback device 102 sends a fetch message requesting the audio content at the URI for the audio pipeline. Based on this fetch message, at 773, the command device 104 streams audio content (i.e., one or more audio content snippets) to the paired playback device 102 via the established pipeline. As described above, the audio content fed into the pipeline by the command device 104 changes based on which audio channel is tuned on the dial 436.

In some examples, the command device 104 may decode or transcode the audio track prior to streaming a representative portion of the audio track to the paired playback device 102 as an audio content snippet. Some streaming audio services encode audio tracks in non-sequential formats, such as Ogg Vorbis, which can prevent snippets from being extracted from the audio track directly. Decoding such audio tracks into a raw format (e.g., PCM) or transcoding into a sequential format facilitates creation of an audio content snippet from the audio track. In addition, such decoding or transcoding may facilitate playback by legacy playback devices, which might not support newer formats.

Referring back to FIG. 7, at 774, the command device 104 sends a message to the paired playback device 102 with the audio track URI and an offset. The audio track URI indicates the network location of the full audio track at the content server 105. The offset indicates the end of the audio content snippet within the full audio track. The paired playback device 102 can begin playing the full audio track from this play position to seamlessly transition between the audio content snippet (from the command device 104) and the full audio track (from the content server 105). Within examples, the command device 104 sends the message to the paired playback device 102 with the audio track URI and the offset based on a trigger (e.g., expiration of a timer) that indicates the user wants to continue listening to that audio channel.

At 775, based on receiving the message from the command device 104 with the audio track URI and the offset, the paired playback device 102 sends a fetch message to the content server 105 to request a stream of the audio track from the content server 105. Based on this fetch message, at 776, the content server 105 streams the audio track (i.e., one or more audio content snippets) to the paired playback device 102 for playback.

Upon receiving the audio track, the paired playback device 102 stitches together the audio content snippet and the audio track. The paired playback device 102 may stitch the audio track when the audio content snippet is finish playing (e.g., after×sec), or, alternatively, the paired playback device 102 may stitch the audio track in prior to completion of the audio content snippet. To facilitate stitching the content together, an "end of audio" bit may indicate the end of the data for the audio snippet to designate when the paired playback device 102 needs to begin playing back the audio track from the offset, to effectively stitch together the audio content.

Figure 8A:
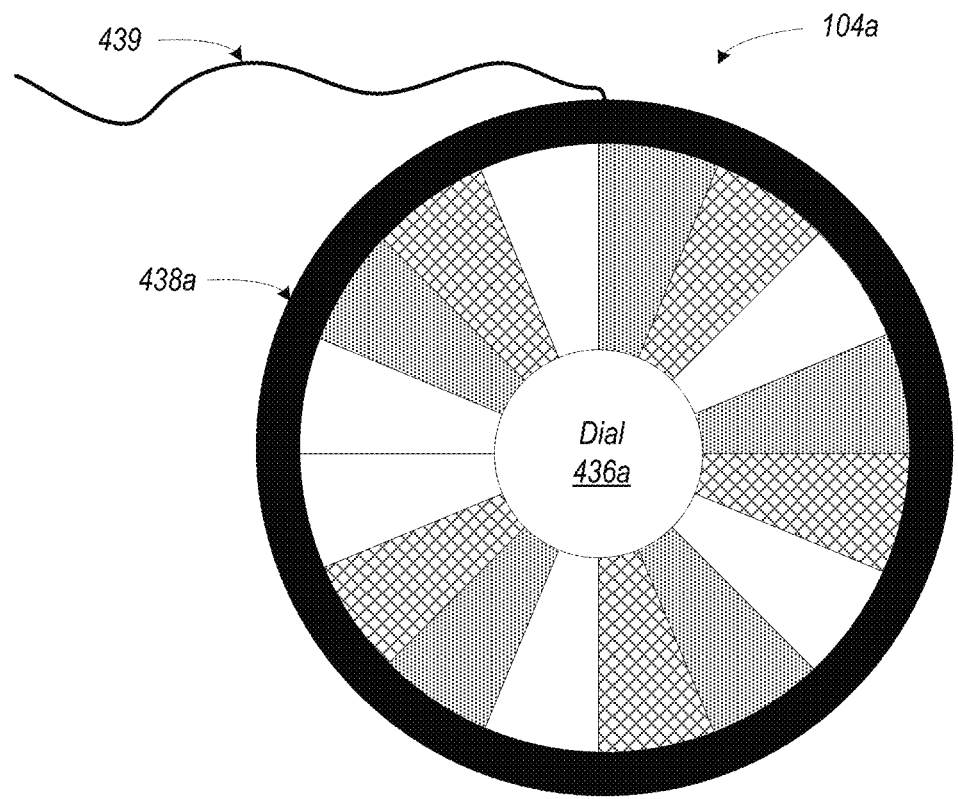
FIGS. 8A and 8B are several views of an example command device, according to example implementations.
Figure 8B:
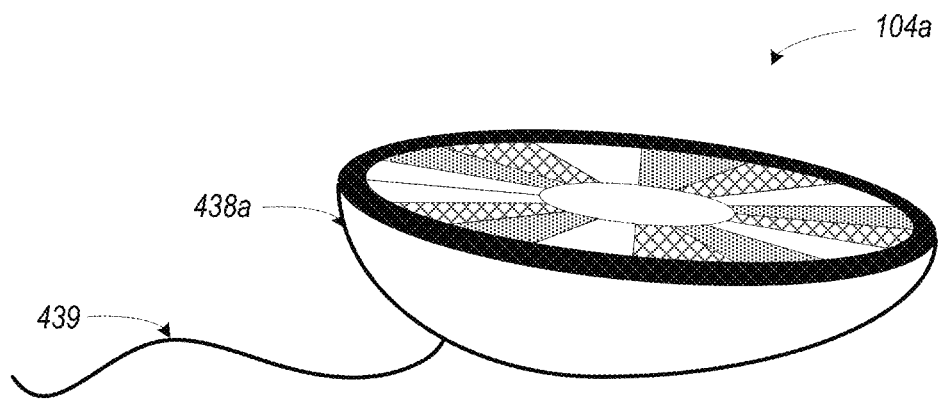

Turning now to FIGS. 8A and 8B, these figures show several views of an example command device 104a. As shown, command device 104a includes a housing 438a to carry various components of the command device, including a graphical display showing the dial 436a. The housing 438a tilts the graphical display to show the dial 436a at a convenient angle when the housing 438a is supported by a surface, such as a table. FIGS. 8A and 8B also show a power cable 439, which may power the command device 104a and/or charge a battery of the command device 104a.

Figure 9A:
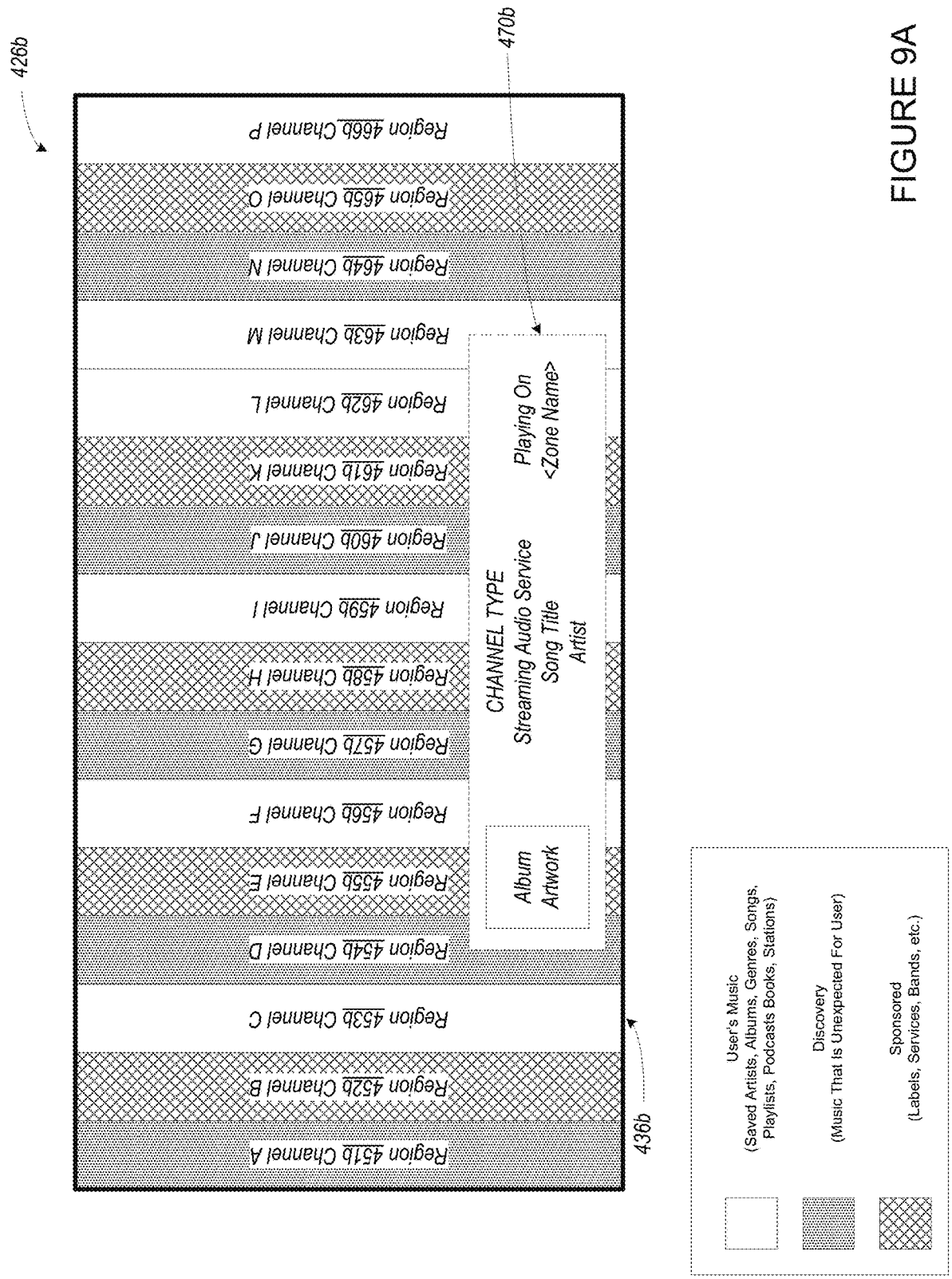
FIGS. 9A, 9B, and 9C are example dial interfaces in accordance with aspects of the disclosure.

FIG. 9A shows an example user interface 426b that includes a dial 436b, which the command device 104 displays on a touch-sensitive graphical display. Dial 436b includes multiple selectable regions 451b-466b that divide the rectangular graphical user interface 426a. Generally, each selectable region 451b-466b is similar to the selectable regions 450a-466a, as each selectable region 451b-466b corresponds to a respective streaming audio channel (designated channels A-P). Selection of a particular selectable region (e.g., via touch input to the region) causes the channel to begin playing on the playback device(s) 102 that are paired with the command device 104.

Figure 9B:
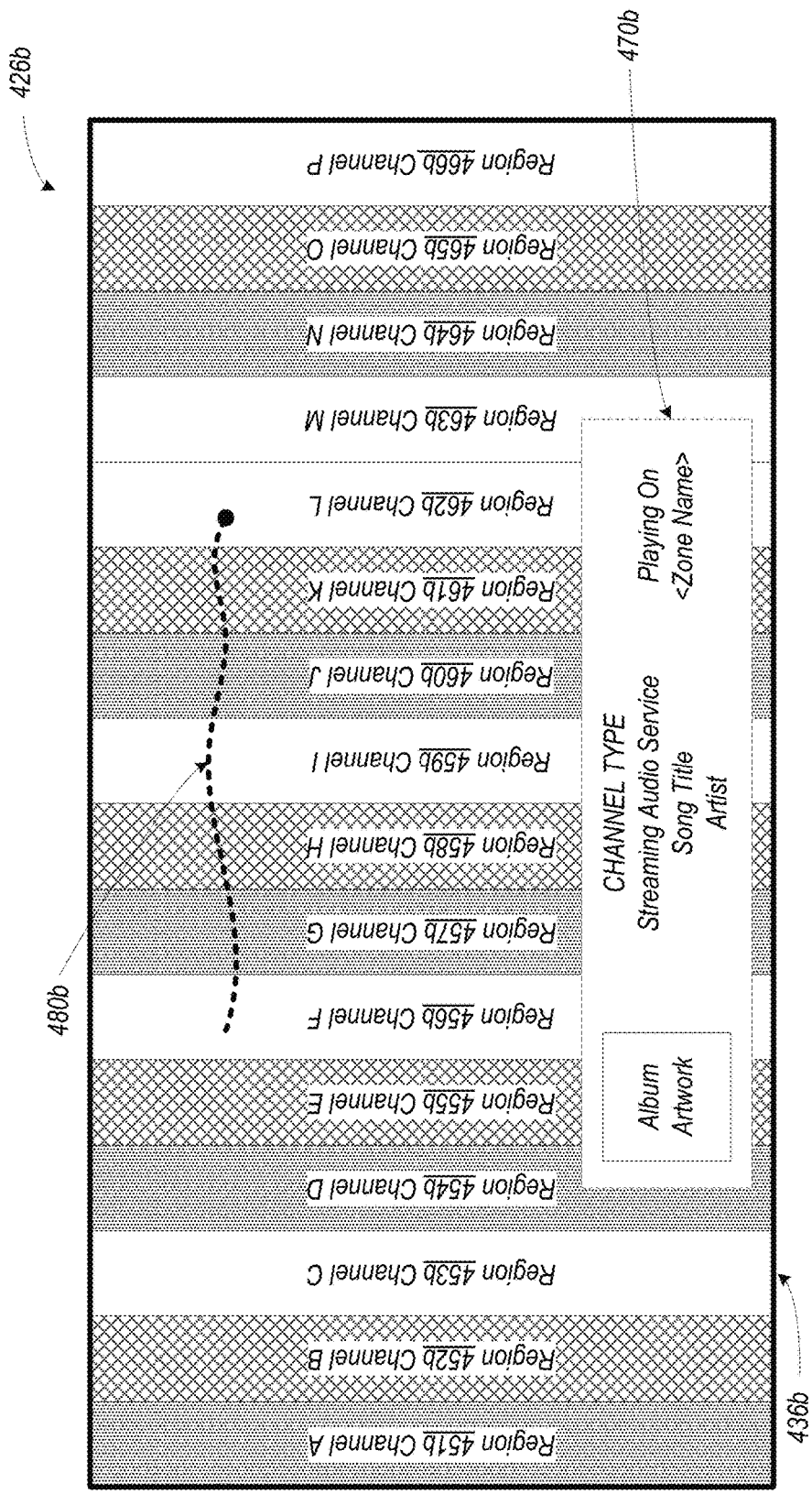

Tuning the dial 436b involves a touch input in a horizontal motion. To illustrate, FIG. 9B shows an example touch input 480b to example user interface 426b. As shown, touch input 480b begins on selectable region 463a and continues through regions 464a and region 465a and stops on region 466a, where the touch input is lifted. As the touch input touches or enters each selectable region, content from that audio channel starts playing on the paired playback device(s) 102.

Similar to user interface 426a and a central region 470a, user interface 426b includes a region 470b that includes information about the currently playing audio channel. In particular, the region 470b includes an indication of the channel type, the streaming audio service providing the audio channel, the audio track title and the artist, as well as artwork for the currently playing audio track of the channel. The region 470b also includes an indication of the paired playback devices 102. In this example, the indication is by reference to the name of a zone of media playback system 100 (i.e., "Playing on <zone name>").

Figure 9C:
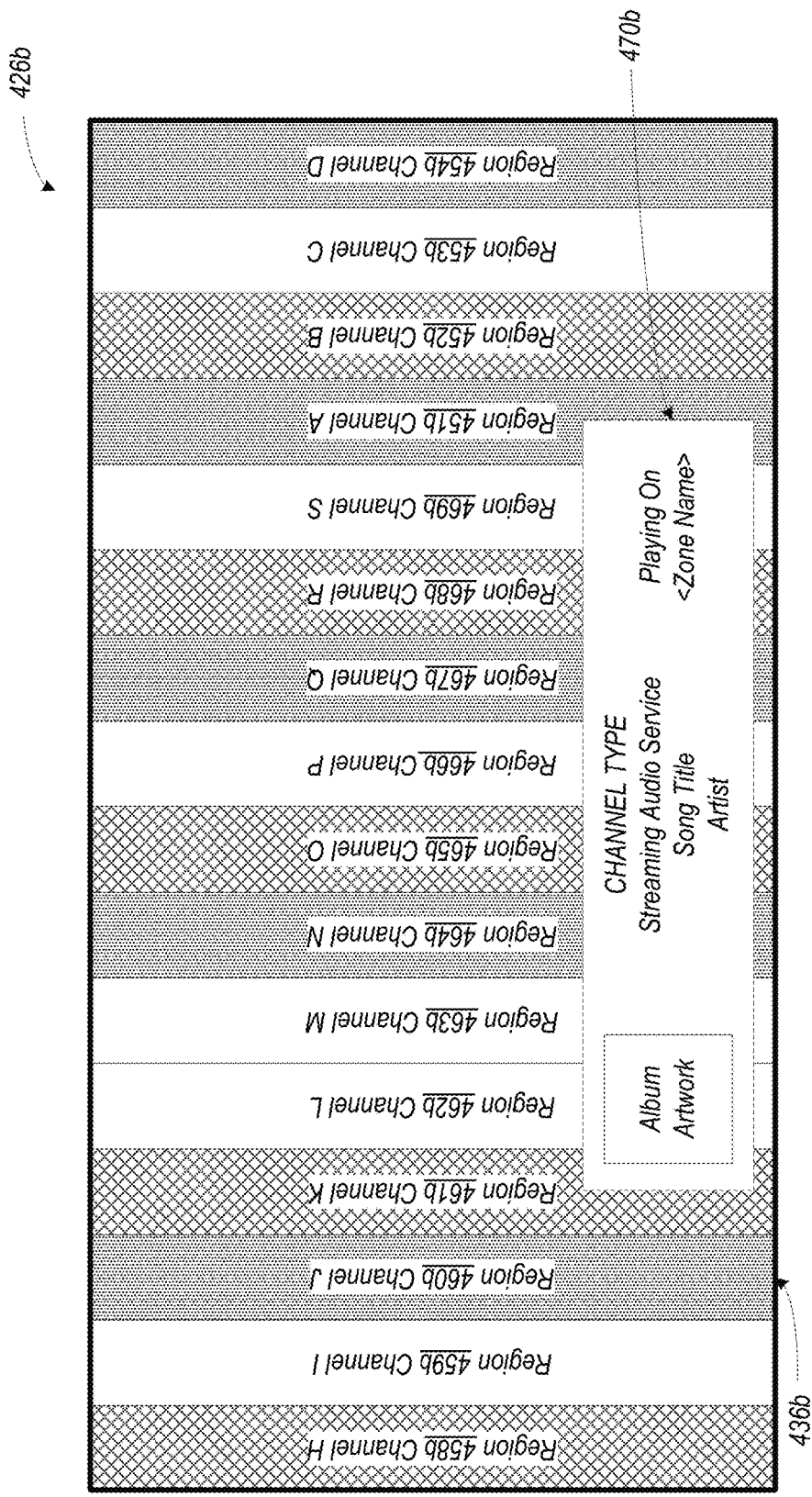

In some instances, the dial 436b may include selectable regions in addition to selectable regions 451b-466b. The command device 104 displays such additional selectable regions when a touch input (e.g., touch input 480b) causes scrolling of the dial 438b. FIG. 9C shows an example of user interface 426b after dial 436b has been scrolled, including additional selectable regions 467b, 468b, and 469b.

Figure 10:
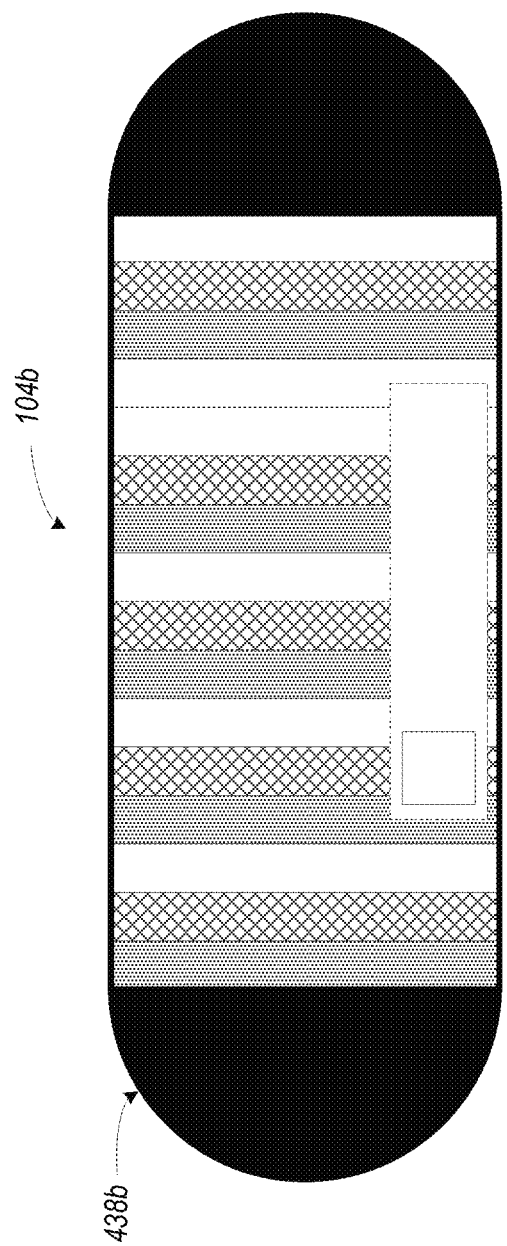
FIG. 10 is a view of another example command device, according to example implementations.

FIG. 10 shows a view of an example command device 104b. As shown, command device 104b includes a housing 438b to carry various components of the command device 104b, including a graphical display showing the dial 436b.

In some examples, the dial 436 of the command device 104 is physical. To illustrate, FIG. 11A shows a command device 104c include a housing 438c. The housing 438c includes a cylindrical portion 482 rotatably mounted to a base 484 to form a dial 436c. Components of the command device (e.g., network interface, processor(s), data storage, battery etc.) may be carried between the cylindrical portion 482 and the base 484 such that the command device as a whole is "puck" shaped.

Tuning the dial 436c involves rotating the cylindrical portion 482 about the base 484. The dial 436c may be notched with each notch corresponding to a respective audio channel. As the dial 436c is rotated, the notches provide haptic feedback on the tuning of different channels. Alternatively, the cylindrical portion 482 is rotatably mounted to the base 484 such that rotation of the dial 436c is smooth.

The command device 104c may include a user interface 426c with a touch-sensitive graphical display. The touch-sensitive graphical display to provide visual feedback as to the tuning of the audio channels via the dial 436c. In some examples, as the rotation of the cylindrical portion 482 continues about the base 484, the command device 104c scrolls the circular graphical user interface through the multiple wedge-shaped selectable regions in the direction of the rotation. The user interface 426c scrolls through a wedge-shaped selectable region for each notch on the dial. Within examples, such scrolling may rotate the selectable regions 451b-466b about the center of user interface 426c such that the current audio channel remains aligned with a reference point, such as a the twelve o'clock position.

While the command device 104c is shown with a touch-sensitive graphical display, some implementations of a command device might exclude a graphical display. In such implementations, input may be provided via the dial 436c (to tune the dial 436c). Some implementations may include a touch-sensitive (e.g., capacitive) surface that is not a display, to facilitate additional input, such as transport controls.

Figure 12A:
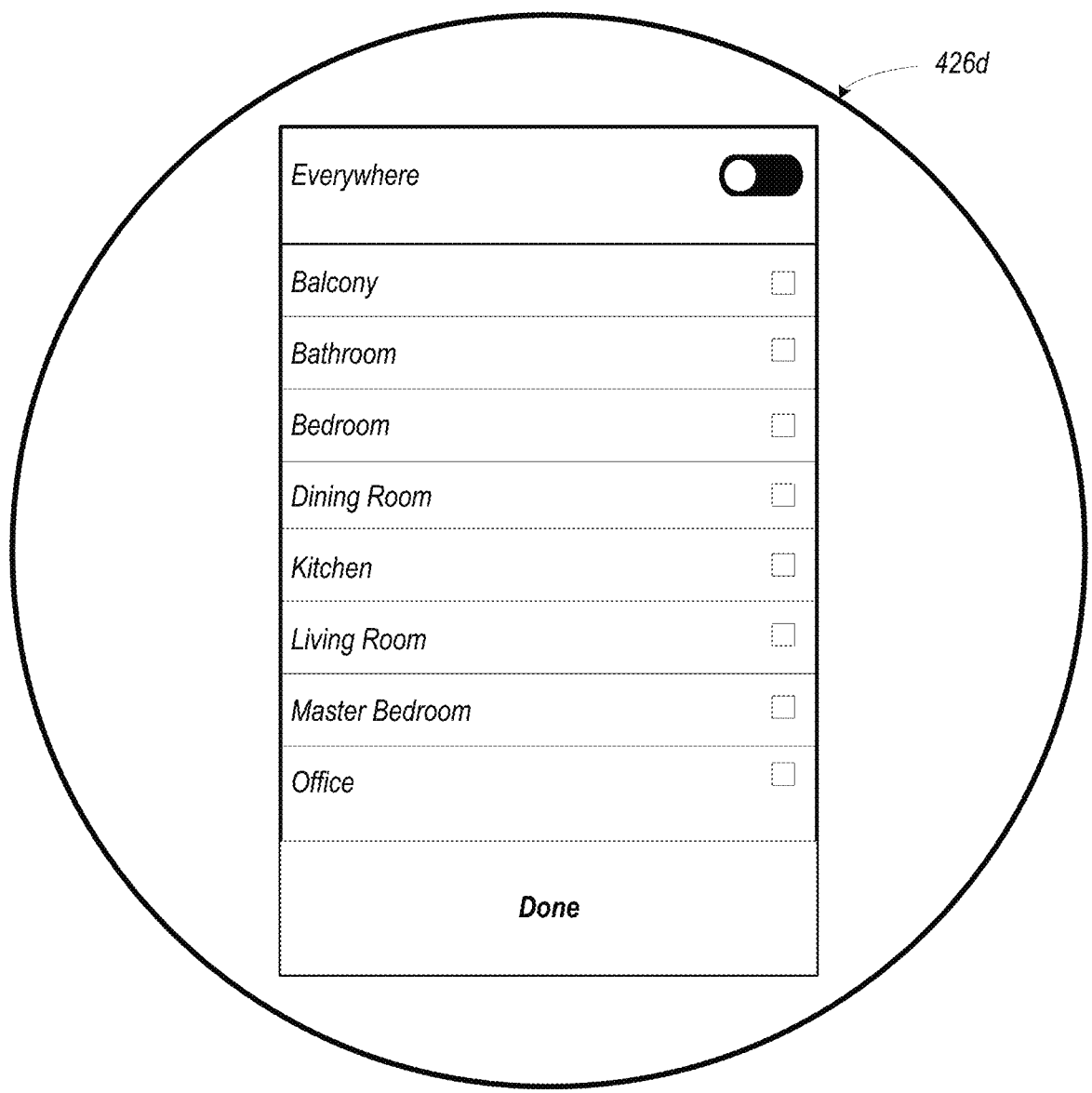
FIGS. 12A and 12B are example controller interfaces in accordance with aspects of the disclosure.

The touch-sensitive graphical display may also provide display of various additional screens of the user interface 426 corresponding to other functions of the command device, such as selecting the paired playback device(s) 102 or selecting audio content by searching or browsing, in addition to selection via the dial 436. To illustrate, FIG. 12A shows user interface 426d, which facilitates selecting playback device(s) 102 to pair with the command device. As shown, user interface 426d includes a list of the zones in media playback system 100. In user interface 426d, selection of a checkbox next to a zone name causes the playback device(s) 102 of that zone to be paired with the command device 104. Selection of multiple zone names causes a zone group to be formed between the zones (if not already formed) and the command device 104 to be paired with the zone group (and thereby control all playback devices 102 in the zone group). Selection of the "Everywhere" toggle places the media playback system 100 into party mode (in which all playback devices 102 play music synchronously) and pairs the command device 104 with all playback devices 102 in the media playback system 100 (i.e., playback devices 102a-102k). While user interface 426d is described with reference to command device 104c, user interface 426d (or similar) can also be displayed on any command device 104 to facilitate selection playback device(s) 102 to pair with the command device. Alternatively, as noted above, pairing can be dynamic (e.g., based on proximity of the command device 104 to certain playback device(s) 102) and the command device may update the paired playback device 102 automatically (and possibly display the currently pairing on the user interface 426).

Figure 12B:
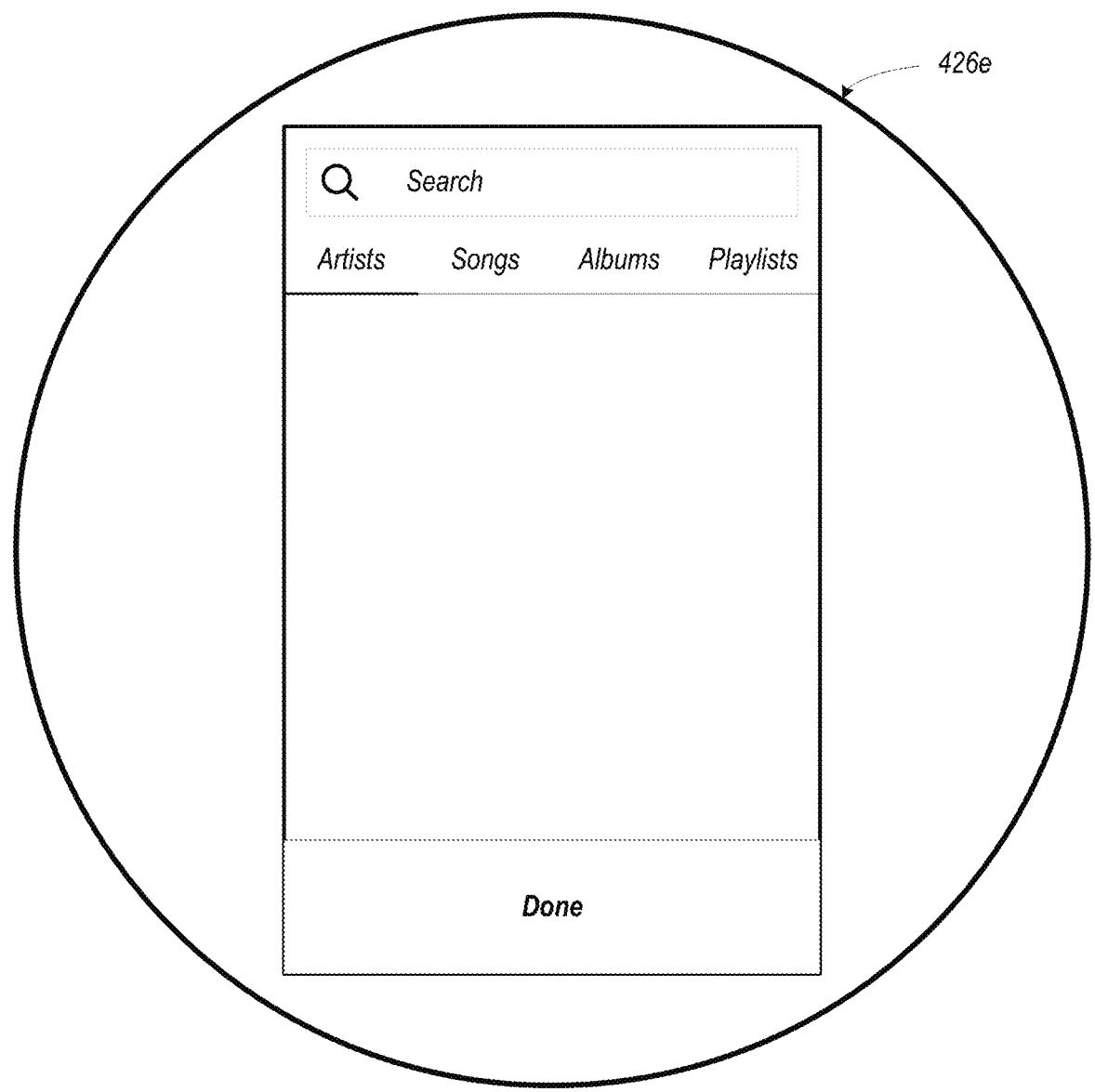

FIG. 12B shows user interface 426e, which facilitates searching audio content. As shown, the user interface 426e includes a search bar, which can be used to search across streaming audio services registered to the media playback system 100. User interface 426e also includes controls to search by artists, songs (i.e., track title), albums, or playlists. Search results for a given search appear below these controls.

As noted above, a command device 104 may include sensors 428 to detect the proximity of a user to the command device 104. Based on detecting proximity of a user to a command device 104, the command device 104 may perform various operations described herein. For instance, the command device 104 may enables a graphical display (and displays a graphical user interface that includes the dial 436) based on proximity of the user to a command device 104. Further, the command device 104 may detect nearby playback device(s) 102 to facilitate pairing (or to verify that the paired playback devices 102 remain the nearest playback devices). Another example, the command device 104 may display a graphical user interface that facilitates pairing, such as user interface 426d.

As further examples, the command device 104 may prepare the content. For instance, the command device 104 may load the content list and prepare the audio content snippets for each audio channel in the content list. In some examples, the command device 104 may verify integrity of the content links. If any content link is stale (i.e., the link no longer provides access to the audio track at the network location), the command device 104 replaces the audio channel with the stale content link with another audio channel. In some examples, the command device 104 can send the content list to the playback device, and the playback device can store the content list in its queue for playback.

Figure 13A:
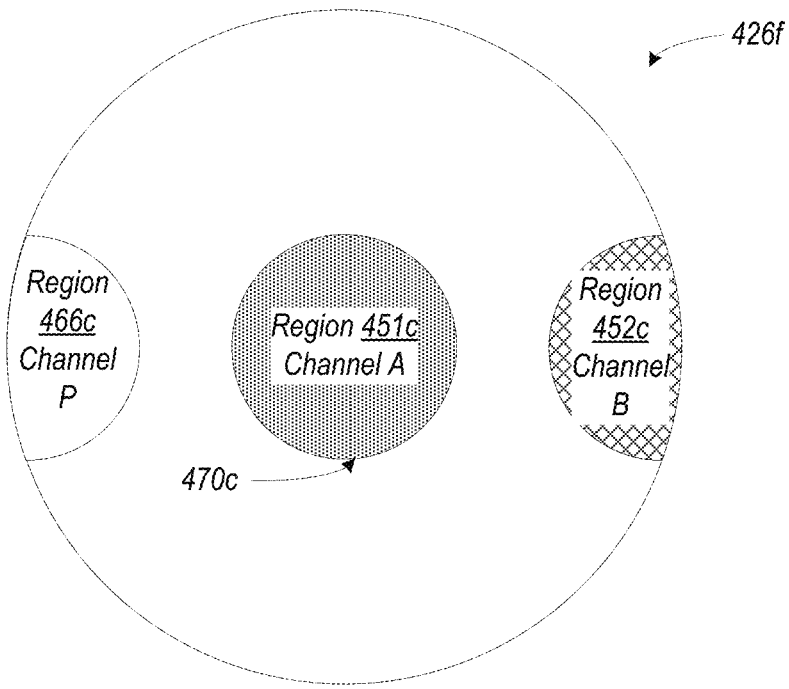
FIGS. 13A, 13B, 13C, 13D, and 13E are example controller interfaces in accordance with aspects of the disclosure.
Figure 13B:
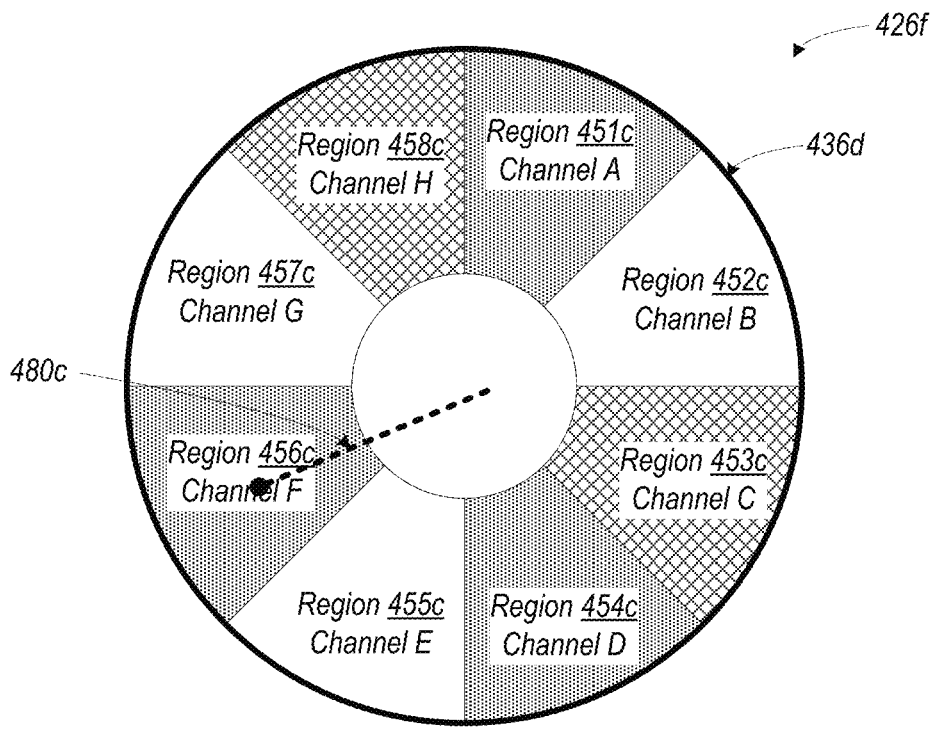

FIGS. 13A and 13B shows user interface 426f, which is another example of a user interface to tune audio channels. As shown in FIG. 13A, selectable regions are displayed linearly, with a portion of the selectable regions not visible at any given time. A press and hold touch input cause the paired playback device(s) 102 to seek through audio channels in the content list (thereby causing the selectable regions to scroll). For instance, as seeking occurs, region 452c takes the place of region 451c and region 453c may take the place of region 452c. When the touch input is released, the paired playback device(s) 102 plays the current audio channel (i.e., the audio channel corresponding to the selectable region in the center of the user interface 4260. Swipe inputs to the left or right skip forward and backward, respectively, through the audio channels of the content list.

Some of the touch inputs correspond to transport controls. For instance, a short press to user interface 426f causes the paired playback device(s) 102 to toggle play and pause. User interface 426f may be implemented on a "puck" style command device, such as command device 104c, among other examples. In such examples, rotating the puck may raise and lower volume level of the paired playback device(s) 102, as tuning is performed via the user interface 426f. User interface 426f may be implemented on other types of command devices as well, such as command device 104a.

A touch and hold input to the central region 470c cause the user interface 426f to display a dial 436d with "preset" audio channels. Then, to tune to a preset audio channel of the dial 436d, a swiping motion is made from the central region 470c to one of the selectable regions 451c-458c. Touch input 480c illustrates such a swiping motion.

Figure 13C:
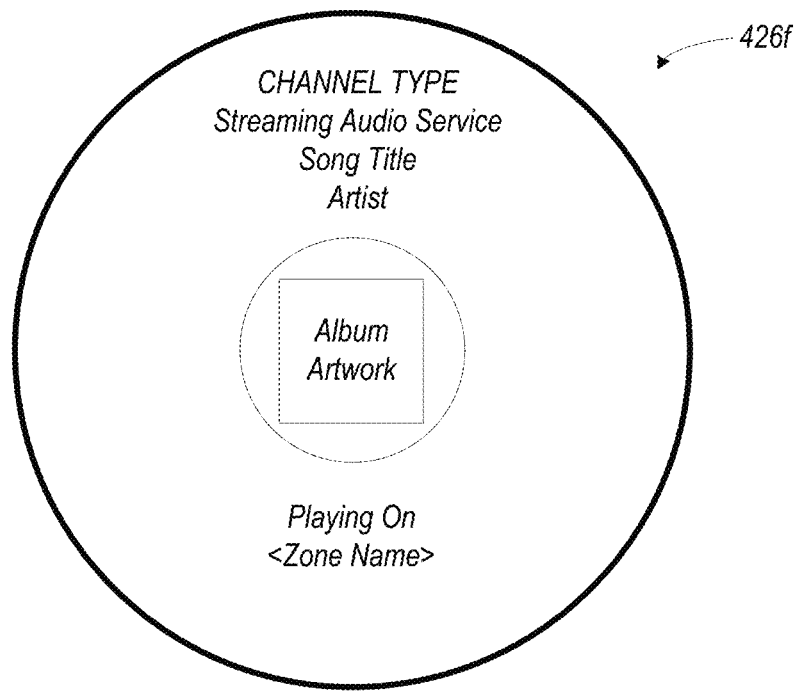

The user interface 426f may display information about the state of the paired playback device(s) 102. For instance, when audio is playing on the paired playback device(s) 102, the user interface 426f may display an indication of the currently playing audio content, as shown in FIG. 13C. The user interface 426f may also display an indication of the currently paired playback device(s) 102, as further shown in FIG. 13C.

Figure 13D:
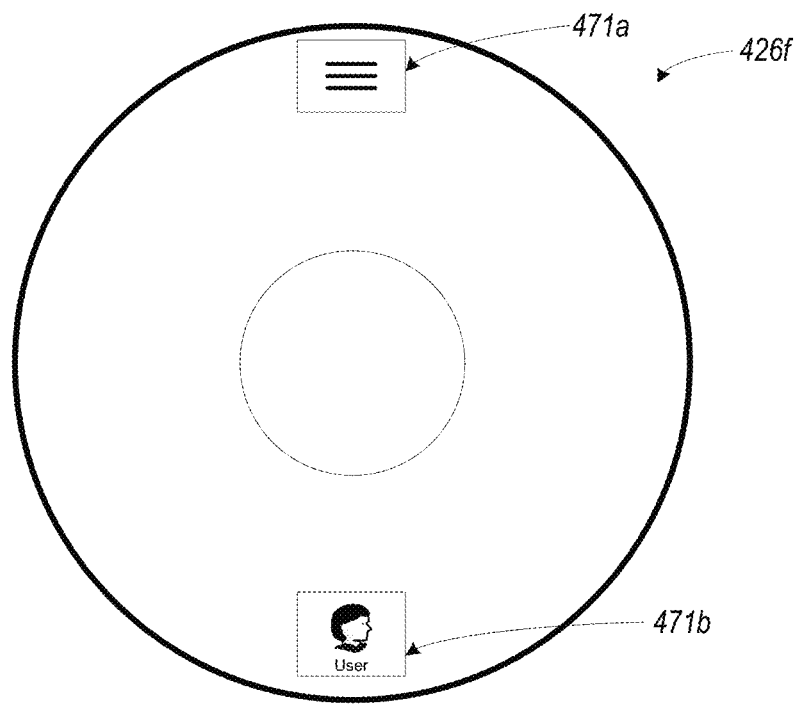

While horizontal touch inputs cause switching among audio channels, vertical touch inputs may access other screens of the user interface 426f. For instance, as shown in FIG. 13D, a swipe or other touch input to selectable region 471a may cause access display of a search or browse interface, similar to user interface 426e. A swipe or other touch input to selectable region 471a may cause access display of an interface to access settings of the user account and perhaps switch among user accounts, among other examples.

Figure 13E:
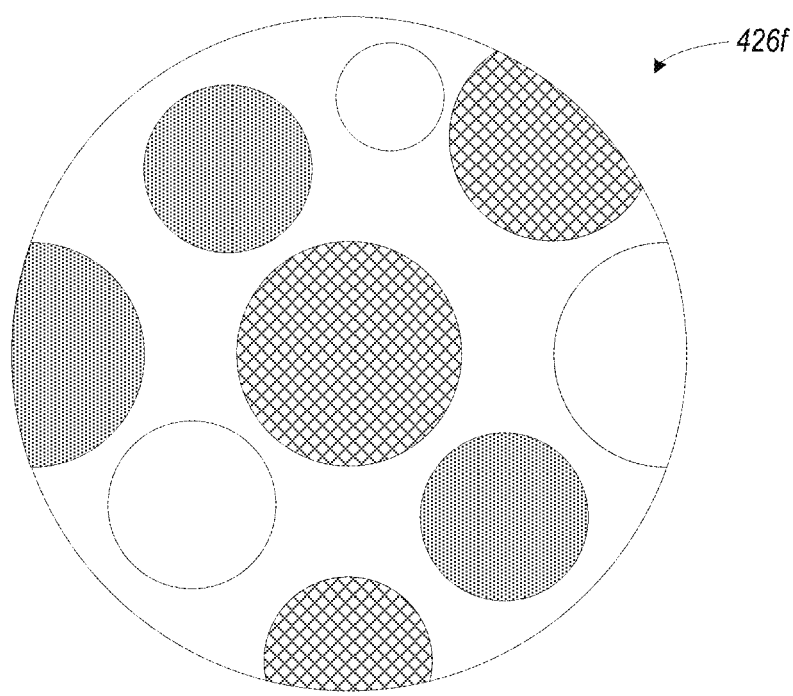

In some examples, selectable regions of various sizes are displayed on user interface 426f, as shown in FIG. 13E. Each selectable region corresponds to a recently played audio channel. A pinch-and-zoom touch input may permit scrolling the user interface 426f to reveal portions of the user interface 426f that are not presently displayed.

IV. Example Techniques to Tune a Music Discovery Dial

Figure 14:
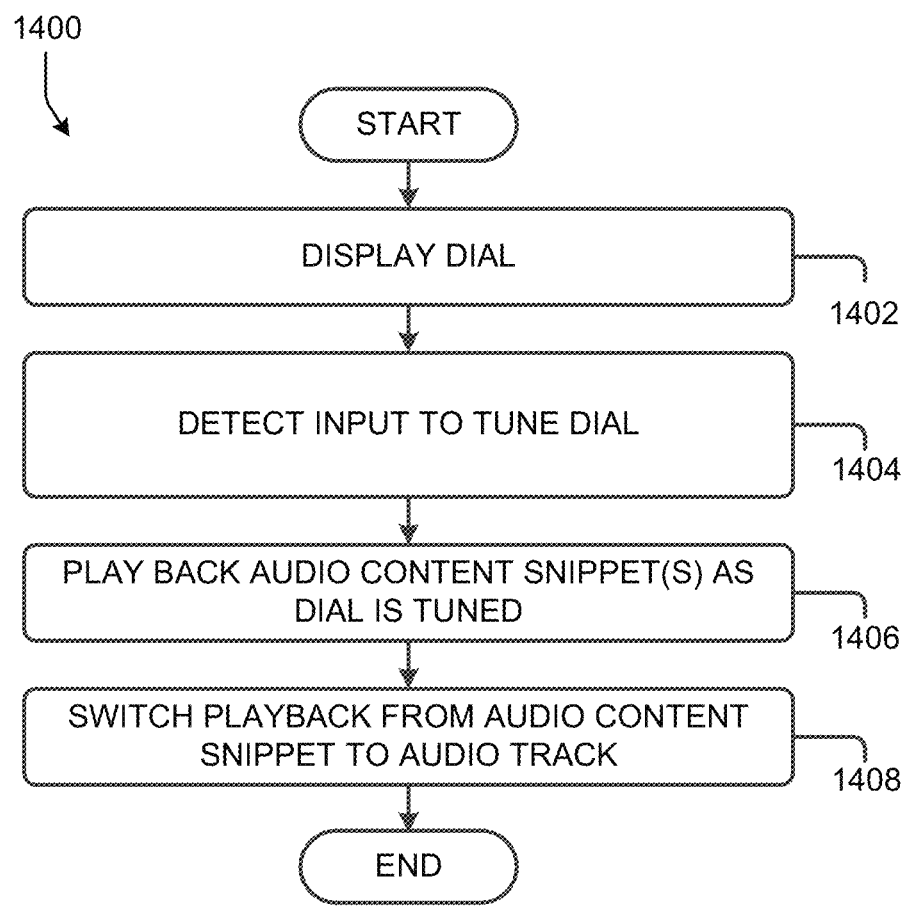
FIG. 14 shows a technique to tune a discovery dial, according to example implementations.

Implementation 1400 shown in FIG. 14 presents example embodiments of techniques described herein. These example embodiments that can be implemented within an operating environment including, for example, the media playback system 100 of FIG. 1, one or more of the playback device 200 of FIG. 2, one or more of the control device 300 of FIG. 3, one or more of the command devices of FIG. 5, as well as other devices described herein and/or other suitable devices. Further, operations illustrated by way of example as being performed by a media playback system can be performed by any suitable device, such as a playback device or a control device of a media playback system. Implementation 1400 may include one or more operations, functions, or actions as illustrated by one or more of blocks shown in FIG. 14. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

As discussed above, embodiments described herein involve tuning a music discovery dial. FIG. 13 illustrates an example implementation 1400 by which a command device tunes a music discovery dial.

a. Display Dial

At block 1402, implementation 1400 involves displaying a dial 436. For instance, the command device 104a may display, on a touch-sensitive circular graphical display, a circular graphical user interface (e.g., user interface 426a)

comprising multiple wedge-shaped selectable regions arranged around the circumference of the circular graphical user interface (e.g., selectable regions 451a-466a). As another example, the command device 104b may display, on a touch-sensitive rectangular graphical display, a rectangular graphical user interface (e.g., user interface 426b) comprising multiple selectable regions that divide the rectangular graphical user interface (e.g., selectable regions 451b-466b).

b. Detect Input to Tune Dial

At block 1404, implementation 1400 involves detecting input to tune the dial 436. For instance, command device 104a may detect a touch input in a circular motion to the touch-sensitive circular graphical display. As another example, command device 104b may detect a touch input in a horizontal motion to the touch-sensitive circular graphical display. As a further example, command device 104c may detect rotation of the cylindrical portion 482 about the base 484.

c. Play Audio Content Snippets as Dial is Tuned

In FIG. 14, at block 1406, implementation 1400 involves playing the audio content snippets as the dial 436 is tuned. For instance, when the touch input 480a enters a first wedge-shaped selectable region (e.g., region 463a), the command device 104a causes, via the network interface 430, one or more playback devices 102 that are paired with the command device 104a to play back a first pre-cached audio content snippet corresponding to the first wedge-shaped selectable region (e.g., region 463a). As another example, when the touch input 480a enters a second wedge-shaped selectable region (e.g., region 466a), the command device 104a causes, via the network interface 430, the one or more playback devices 102 that are paired with the command device 104a to play back a second pre-cached audio content snippet corresponding to the second wedge-shaped selectable region. As described above, each pre-cached audio content snippet is a portion of a respective audio track that is representative of a given streaming audio channel corresponding to each wedge-shaped selectable region.

In a further example, when the touch input 480b enters a first selectable region (e.g., region 456a), the command device 104b causes, via the network interface 430, one or more playback devices 102 that are paired with the command device 104b to play back a first pre-cached audio content snippet corresponding to the first selectable region. Then, when the touch input 480b enters a second wedge-shaped selectable region (e.g., region 462a), the command device 104b causes, via the network interface 430, the one or more playback devices 102 that are paired with the command device 104b to play back a second pre-cached audio content snippet corresponding to the second wedge-shaped selectable region. As described above, each pre-cached audio content snippet is a portion of a respective audio track that is representative of a given streaming audio channel corresponding to each wedge-shaped selectable region.

In yet another example, when the dial 436c selects a first wedge-shaped selectable region, the command device 104c causes, via the network interface 430, one or more playback devices 102 that are paired with the command device 104c to play back a first pre-cached audio content snippet corresponding to the first wedge-shaped selectable region. When the dial 436c selects a second wedge-shaped selectable region, the command device 104c causes, via the network interface 430, the one or more playback devices 102 that are paired with the command device 104c to play back a second pre-cached audio content snippet corresponding to the second wedge-shaped selectable region. As described above, each pre-cached audio content snippet is a portion of a respective audio track that is representative of a given streaming audio channel corresponding to each wedge-shaped selectable region.

d. Switch Playback from Audio Content Snippet to Audio Track

Referring again to FIG. 14, at block 1408, implementation 1400 involves switching playback from the audio content snippet to the audio track. For instance, as the second pre-cached audio content snippet plays back on the one or more playback devices 102, the command device 104 switches the one or more playback devices from playing back the second pre-cached audio content snippet to playing back the second audio track from one or more servers of a streaming audio service. In particular, the command device 104 may cause the playback device(s) 102 to stitch together the second audio content snippet and the second audio track such that playback transitions seamlessly from the pre-cached second audio content snippet to the second audio track. Examples techniques are described above in connection with FIG. 7.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising displaying, on a touch-sensitive circular graphical display, a circular graphical user interface comprising multiple wedge-shaped selectable regions arranged around the circumference of the circular graphical user interface, each wedge-shaped selectable region corresponding to a respective streaming audio channel; detecting, via the command device, a touch input in a circular motion to the touch-sensitive circular graphical display; when the touch input enters a first wedge-shaped selectable region, causing, via a network interface, one or more playback devices that are paired with the command device to play back a first pre-cached audio content snippet corresponding to the first wedge-shaped selectable region, wherein the first pre-cached audio content snippet consists of a portion of a first audio track that is representative of a first streaming audio channel corresponding to the first wedge-shaped selectable region; when the touch input enters a second wedge-shaped selectable region, causing, via the network interface, the one or more playback devices that are paired with the command device to play back a second pre-cached audio content snippet corresponding to the second wedge-shaped selectable region, wherein the second pre-cached audio content snippet consists of a portion of a second audio track that is representative of a second streaming audio channel corresponding to the second wedge-shaped selectable region; and as the second pre-cached audio content snippet plays back on the one or more playback devices, switching, via the network interface of the command device, the one or more playback devices from playing back the second pre-cached audio content snippet to playing back the second audio track from one or more servers of a streaming audio service by stitching together the second audio content snippet and the second audio track such that playback transitions seamlessly from the pre-cached second audio content snippet to the second audio track.

(Feature 2) The method of feature 1, wherein a first subset of the wedge-shaped selectable regions correspond to respective streaming audio channels that include audio tracks associated with a user account that is registered to the command device, wherein a second subset of the wedge-shaped selectable regions correspond to respective streaming audio channels that include new release audio tracks; and wherein a third subset of the wedge-shaped selectable regions correspond to respective streaming audio channels that include audio tracks that are different from the audio tracks associated with the user account.

(Feature 3) The method of feature 1, wherein wedge-shaped selectable regions from the first, second, and third subsets are interspersed around the circumference of the circular graphical user interface.

(Feature 4) The method of feature 1, further comprising pre detecting, via the proximity sensor, proximity of a user to the command device and in response to detecting proximity of the user to the command device, enabling the proximity of a user to the command device and displaying the circular graphical user interface on the touch-sensitive circular graphical display.

(Feature 5) The method of feature 1, further comprising pre-caching, via the network interface within the data storage, audio content snippets consisting of characteristic portions of the audio tracks that are representative of the streaming audio channels corresponding to each wedge-shaped selectable region.

(Feature 6) The method of feature 1, wherein the one or more playback devices are configured into a particular zone of a zone-based media playback system, and wherein the method further comprises displaying, on the touch-sensitive circular graphical display concurrently with the multiple wedge-shaped selectable regions, a graphical indication of the particular zone.

(Feature 7) The method of feature 1, further comprising displaying, on the touch-sensitive circular graphical display concurrently with the multiple wedge-shaped selectable regions, one or more additional wedge-shaped selectable regions corresponding to respective categories of streaming audio channels, detecting, via the touch-sensitive circular graphical display, a touch input to select one of the one or more additional wedge-shaped selectable regions, the selected additional wedge-shaped selectable region corresponding to a particular category of streaming audio channels; and in response to detecting the touch input to select the particular one of the one or more additional wedge-shaped selectable regions, displaying, on the touch-sensitive circular graphical display, another circular graphical user interface comprising multiple second wedge-shaped selectable regions corresponding to streaming audio channels of the particular category of streaming audio channels.

(Feature 8) The method of feature 1, wherein each category of streaming audio channels corresponds to one of: (i) a given artist, (ii) a given genre, (iii) a given record label, (iv) a given streaming audio service.

(Feature 9) The method of feature 1, further comprising forming, via the network interface, an audio pipeline to the one or more playback devices, wherein causing, via the network interface, the one or more playback devices that are paired with the command device to play back the first pre-cached audio content snippet comprises streaming the first pre-cached audio content snippet to the one or more playback devices via the audio pipeline, and wherein causing the one or more playback devices that are paired with the command device to play back the second pre-cached audio content snippet comprises streaming the second pre-cached audio content snippet to the one or more playback devices via the audio pipeline.

(Feature 10) The method of feature 1, wherein the second audio track is encoded in a non-sequential audio codec, and wherein the method further comprises decoding the second audio track into a sequential format, wherein stitching together the second audio content snippet and the second audio track comprises streaming the decoded second audio track in the sequential format to the one or more playback devices.

(Feature 11) A tangible, non-transitory computer-readable medium having stored therein instructions executable by one or more processors to cause a device to perform the method of any of features 1-10.

(Feature 12) A command device configured to perform the method of any of features 1-10.

(Feature 13) A media playback system configured to perform the method of any of features 1-10.

(Feature 14) A system comprising: a network interface; one or more processors; a graphical display; a housing comprising a cylindrical portion rotatably mounted to a base to form a notched dial; a circular graphical display mounted to a top surface of the cylindrical portion; the housing carrying, between the cylindrical portion and the base, the network interface, the one or more processors, and data storage storing pre-cached audio content snippets. The system configured to display, on the circular graphical display, a circular graphical user interface comprising multiple wedge-shaped selectable regions arranged around the circumference of the circular graphical user interface, each wedge-shaped selectable region corresponding to a respective streaming audio channel; detect rotation of the cylindrical portion about the base, wherein each notch on the dial corresponds to a respective wedge-shaped selectable region; as the rotation of the cylindrical portion continues about the base, scrolling the circular graphical user interface through the multiple wedge-shaped selectable regions in the direction of the rotation, wherein the circular graphical user interface scrolls through a wedge-shaped selectable region for each notch on the dial; when the dial selects a first wedge-shaped selectable region, causing, via the network interface, one or more playback devices that are paired with the command device to play back a first pre-cached audio content snippet corresponding to the first wedge-shaped selectable region, wherein the first pre-cached audio content snippet consists of a portion of a first audio track that is representative of a first audio channel corresponding to the first wedge-shaped selectable region; when the dial selects a second wedge-shaped selectable region, causing, via the network interface, the one or more playback devices that are paired with the command device to play back a second pre-cached audio content snippet corresponding to the second wedge-shaped selectable region, wherein the second pre-cached audio content snippet consists of a portion of a second audio track that is representative of a second audio channel corresponding to the second wedge-shaped selectable region; and as the second pre-cached audio content snippet plays back on the one or more playback devices, switching the one or more playback devices from playing back the second pre-cached audio content snippet to playing back the second audio track from one or more servers of a streaming audio service by stitching together the second audio content snippet and the second audio track such that playback transitions seamlessly from the pre-cached second audio content snippet to the second audio track.

(Feature 15) A command device comprising the system of feature 14.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A control device comprising:
 a display;
 at least one network interface;
 at least one processor; and
 at least one non-transitory computer-readable medium collectively comprising program instructions that are executable by the at least one processor such that the control device is configured to:
  display a user interface comprising a set of selectable regions, the set of selectable regions comprising at least a first region and a second region, wherein each region in the set of selectable regions corresponds to respective media content streamable from one or more servers of a streaming media service;
  based on a first input corresponding to a selection of the first region in the set of selectable regions, cause, via the at least one network interface, a media playback system to stream respective first media content from the one or more servers of the streaming media service, wherein the first respective first media content comprises media content previously saved for playback by the media playback system; and
  based on a second input corresponding to a selection of the second region in the set of selectable regions, cause, via the at least one network interface, the media playback system to stream respective second media content from the one or more servers of the streaming media service, wherein the respective second media content comprises media content different than the media content previously saved for playback by the media playback system.

2. The control device of claim 1, wherein the program instructions that are executable by the at least one processor such that the control device is configured to cause the media playback system to stream the respective first media content comprise program instructions that are executable by the at least one processor such that the control device is configured to:
 cause at least one playback device of the media playback system to play back the respective first media content.

3. The control device of claim 2, wherein the program instructions that are executable by the at least one processor such that the control device is configured to cause the media playback system to stream the respective first media content comprise program instructions that are executable by the at least one processor such that the control device is configured to:
 cause at least one second playback device of the media playback system to play back the respective first media content in synchrony with the at least one playback device.

4. The control device of claim 2, wherein the program instructions that are executable by the at least one processor such that the control device is configured to cause the media playback system to stream the respective first media content comprise program instructions that are executable by the at least one processor such that the control device is configured to:
 cause the at least one playback device of the media playback system to play back the respective first media content without causing at least one second playback device of the media playback system to play back the respective first media content.

5. The control device of claim 2, wherein the program instructions that are executable by the at least one processor such that the control device is configured to cause the media playback system to stream the respective first media content comprise program instructions that are executable by the at least one processor such that the control device is configured to:
 cause the at least one playback device of the media playback system to play back the respective second media content.

6. The control device of claim 2, wherein the program instructions that are executable by the at least one processor such that the control device is configured to cause the media playback system to stream the respective first media content comprise program instructions that are executable by the at least one processor such that the control device is configured to:
 cause at least one second playback device of the media playback system to play back the respective second media content.

7. The control device of claim 1, wherein the media playback system comprises the control device.

8. The control device of claim 1, wherein the at least one non-transitory computer-readable medium further comprises program instructions such that the control device is configured to:
 based on a third input corresponding to a selection of a third region in the set of selectable regions, cause, via the at least one network interface, the media playback system to stream respective third media content from the one or more servers of the streaming media service, wherein the third media content comprises sponsored media content.

9. The control device of claim 8, wherein the sponsored media content comprises advertisement.

10. The control device of claim 1, wherein the media content previously saved for playback comprises one or more of: an audio track, a playlist, or an album.

11. At least one non-transitory computer-readable medium collectively comprising program instructions that are executable by at least one processor such that a control device is configured to:
- display, via a display of the control device, a user interface comprising a set of selectable regions, the set of selectable regions comprising at least a first region and a second region, wherein each region in the set of selectable regions corresponds to respective media content streamable from one or more servers of a streaming media service;
- based on a first input corresponding to a selection of the first region in the set of selectable regions, cause, via at least one network interface, a media playback system to stream respective first media content from the one or more servers of the streaming media service, wherein the first respective first media content comprises media content previously saved for playback by the media playback system; and
- based on a second input corresponding to a selection of the second region in the set of selectable regions, cause, via the at least one network interface, the media playback system to stream respective second media content from the one or more servers of the streaming media service, wherein the respective second media content comprises media content different than the media content previously saved for playback by the media playback system.

12. The at least one non-transitory computer-readable medium of claim 11, wherein the program instructions that are executable by the at least one processor such that the control device is configured to cause the media playback system to stream the respective first media content comprise program instructions that are executable by the at least one processor such that the control device is configured to:
- cause at least one playback device of the media playback system to play back the respective first media content.

13. The at least one non-transitory computer-readable medium of claim 12, wherein the program instructions that are executable by the at least one processor such that the control device is configured to cause the media playback system to stream the respective first media content comprise program instructions that are executable by the at least one processor such that the control device is configured to:
- cause at least one second playback device of the media playback system to play back the respective first media content in synchrony with the at least one playback device.

14. The at least one non-transitory computer-readable medium of claim 12, wherein the program instructions that are executable by the at least one processor such that the control device is configured to cause the media playback system to stream the respective first media content comprise program instructions that are executable by the at least one processor such that the control device is configured to:
- cause the at least one playback device of the media playback system to play back the respective first media content without causing at least one second playback device of the media playback system to play back the respective first media content.

15. The at least one non-transitory computer-readable medium of claim 12, wherein the program instructions that are executable by the at least one processor such that the control device is configured to cause the media playback system to stream the respective first media content comprise program instructions that are executable by the at least one processor such that the control device is configured to:
- cause the at least one playback device of the media playback system to play back the respective second media content.

16. The at least one non-transitory computer-readable medium of claim 12, wherein the program instructions that are executable by the at least one processor such that the control device is configured to cause the media playback system to stream the respective first media content comprise program instructions that are executable by the at least one processor such that the control device is configured to:
- cause at least one second playback device of the media playback system to play back the respective second media content.

17. The at least one non-transitory computer-readable medium of claim 11, wherein the media playback system comprises the control device.

18. The at least one non-transitory computer-readable medium of claim 11, wherein the at least one non-transitory computer-readable medium further comprises program instructions such that the control device is configured to:
- based on a third input corresponding to a selection of a third region in the set of selectable regions, cause, via the at least one network interface, the media playback system to stream respective third media content from the one or more servers of the streaming media service, wherein the third media content comprises sponsored media content.

19. The at least one non-transitory computer-readable medium of claim 18, wherein the sponsored media content comprises advertisement.

20. A method to be performed by a control device, the method comprising:
- displaying, via a display of the control device, a user interface comprising a set of selectable regions, the set of selectable regions comprising at least a first region and a second region, wherein each region in the set of selectable regions corresponds to respective media content streamable from one or more servers of a streaming media service;
- based on a first input corresponding to a selection of the first region in the set of selectable regions, causing, via at least one network interface of the control device, a media playback system to stream respective first media content from the one or more servers of the streaming media service, wherein the first respective first media content comprises media content previously saved for playback by the media playback system; and
- based on a second input corresponding to a selection of the second region in the set of selectable regions, causing, via the at least one network interface, the media playback system to stream respective second media content from the one or more servers of the streaming media service, wherein the respective second media content comprises media content different than the media content previously saved for playback by the media playback system.

* * * * *